(12) United States Patent
Sakamoto

(10) Patent No.: US 11,573,410 B2
(45) Date of Patent: Feb. 7, 2023

(54) LENS APPARATUS, IMAGE PICKUP APPARATUS, METHOD OF CORRECTING CHANGE IN FOCAL POSITION, AND STORAGE MEDIUM

(71) Applicant: CANON KABUSHIKI KAISHA, Tokyo (JP)

(72) Inventor: Masaru Sakamoto, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 91 days.

(21) Appl. No.: 16/849,546

(22) Filed: Apr. 15, 2020

(65) Prior Publication Data
US 2020/0341245 A1 Oct. 29, 2020

(30) Foreign Application Priority Data
Apr. 26, 2019 (JP) .............................. JP2019-085965

(51) Int. Cl.
*G02B 15/14* (2006.01)
*G02B 13/00* (2006.01)

(52) U.S. Cl.
CPC ......... *G02B 15/14* (2013.01); *G02B 13/0015* (2013.01)

(58) Field of Classification Search
CPC ............... G02B 15/14; G02B 13/0015; G02B 15/145; G02B 15/144113; G05D 1/042; G05D 1/0607; G03B 13/20; G03B 7/00; H04N 5/238
See application file for complete search history.

(56) References Cited

U.S. PATENT DOCUMENTS

| | | | |
|---|---|---|---|
| 2,470,455 A | 5/1949 | Avila | |
| 2,575,020 A * | 11/1951 | Lee | G03B 7/22 396/7 |
| 3,498,695 A | 3/1970 | Brouwer | |
| 2017/0269374 A1* | 9/2017 | Takemoto | G02B 27/646 |
| 2019/0324460 A1* | 10/2019 | Egner | G05D 1/042 |
| 2020/0301445 A1* | 9/2020 | Jourdan | G05D 1/12 |

FOREIGN PATENT DOCUMENTS

| | | |
|---|---|---|
| CN | 101806952 A | 8/2010 |
| JP | 07-063992 A | 3/1995 |
| JP | 8-255748 A | 10/1996 |
| JP | 2001-148337 A | 5/2001 |
| JP | 2007-121701 A | 5/2007 |
| JP | 2009-237271 A | 10/2009 |
| JP | 2015-094864 A | 5/2015 |
| JP | 2015-176118 A | 10/2015 |
| JP | 2016-170292 A | 9/2016 |
| JP | 2017-219650 A | 12/2017 |
| WO | 2014/030304 A1 | 2/2014 |

* cited by examiner

*Primary Examiner* — Alicia M Harrington
(74) *Attorney, Agent, or Firm* — Canon U.S.A., Inc. IP Division

(57) ABSTRACT

A lens apparatus includes zoom lens units configured to move in an optical axis direction for zooming, and a correction lens unit configured to move in the optical axis direction to correct change in a focal position due to change in an atmospheric pressure. The lens apparatus satisfies an inequality $0.4<|fair\_t/fw|<6$ where $fair\_t$ is a composite focal length of an air lens included in one of the zoom lens units having a smallest absolute value of the composite focal length among the zoom lens units and fw is a focal length of the lens apparatus at a wide-angle end.

35 Claims, 15 Drawing Sheets

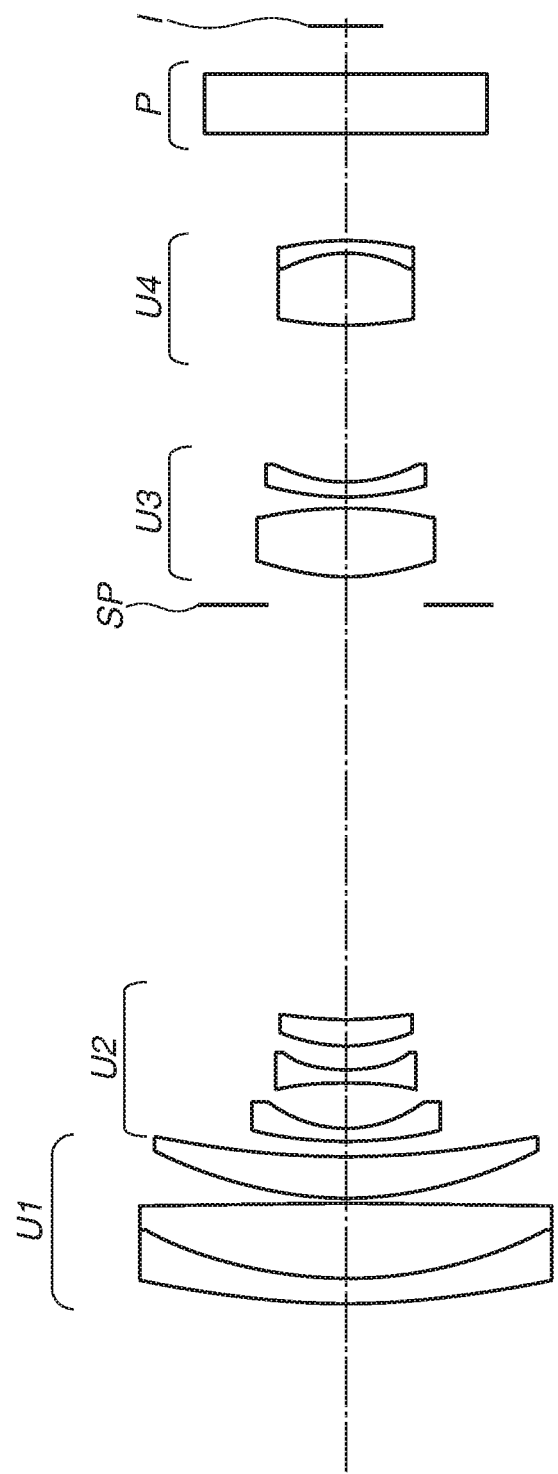

LENS APPARATUS, IMAGE PICKUP APPARATUS, METHOD OF CORRECTING CHANGE IN FOCAL POSITION, AND STORAGE MEDIUM

BACKGROUND OF THE INVENTION

Field of the Invention

The aspect of the embodiments relates to a lens apparatus, an image pickup apparatus, a method of correcting change in a focal position, and a storage medium.

Description of the Related Art

In an exposure apparatus that exposes a substrate to light for manufacturing a product such as a semiconductor device, a change in a focal position of a projecting optical system caused by change in an atmospheric pressure can be a factor in reducing yield or productivity. Thus, the exposure apparatus controls a stage that holds a substrate to compensate for change in the focal position based on the atmospheric pressure as discussed in Japanese Patent Application Laid-Open No. 2001-148337.

The exposure apparatus drives part of optical members in the projecting optical system to compensate a projecting magnification error and a distortion aberration as discussed in Japanese Patent Application Laid-Open No. H8-255748.

An image capturing (also referred to as image pickup) performed by the image pickup apparatus, such as a television camera, a silver-halide film camera, a digital camera, a video camera, can be performed under an atmospheric pressure environment different from a normal atmospheric pressure environment. The image capturing includes, for example, an image capturing performed by the image pickup apparatus that is mounted on a helicopter or a drone and that undergoes a significant change in the atmospheric pressure caused by change in an altitude, and an image capturing performed at a stadium or the like located at a high altitude and thus under a low atmospheric pressure.

A zoom lens of the image pickup apparatus has variable magnification lens units (also referred to as zoom lens units) that include a movable lens unit (variator) mainly for varying magnification (also referred to as zooming) to change a focal length, and a movable lens unit (compensator) for compensating (reducing) movement of an image plane along with the varying magnification. When the zoom lens includes a variable magnification lens unit having high refractive power, with an increase of the refractive power or a magnification variation ratio, the change in the focal position along with the change in the atmospheric pressure tends to increase. If such a zoom lens is used under an atmospheric pressure environment different from the normal atmospheric pressure environment, a focal position shift (deviation of a focal position) may occur along with the change in the atmospheric pressure. A smaller pixel pitch of a camera along with a higher pixel resolution of the camera will cause a depth of focus to be shallower, which would make the focal position shift caused by the change in the atmospheric pressure more noticeable.

SUMMARY OF THE INVENTION

An aspect of embodiments provides, for example, a lens apparatus beneficial in reduction of change in a focal position due to change in an atmospheric pressure.

According to an aspect of the embodiments, a lens apparatus includes zoom lens units configured to move in an optical axis direction for zooming, and a correction lens unit configured to move in the optical axis direction to correct change in a focal position due to change in an atmospheric pressure, wherein the lens apparatus satisfies an inequality $$0.4 < |fv/fw| < 9$$

where $fv$ is a focal length of one of the zoom lens units having a smallest absolute value of a focal length among the zoom lens units and $fw$ is a focal length of the lens apparatus at a wide-angle end.

Further features of the disclosure will become apparent from the following description of exemplary embodiments with reference to the attached drawings.

BRIEF DESCRIPTION OF THE DRAWINGS

FIG. 15 is a cross sectional diagram illustrating a zoom lens according to a fifth numerical example at the wide-angle end and in the infinity in-focus state.

DESCRIPTION OF THE EMBODIMENTS

Exemplary embodiments of the disclosure will be described with reference to the accompanying drawings. The similar members are denoted by the same reference signs throughout all the drawings for illustrating the exemplary embodiments in principle (unless otherwise described), and description thereof is not repeated.

Figure 1:
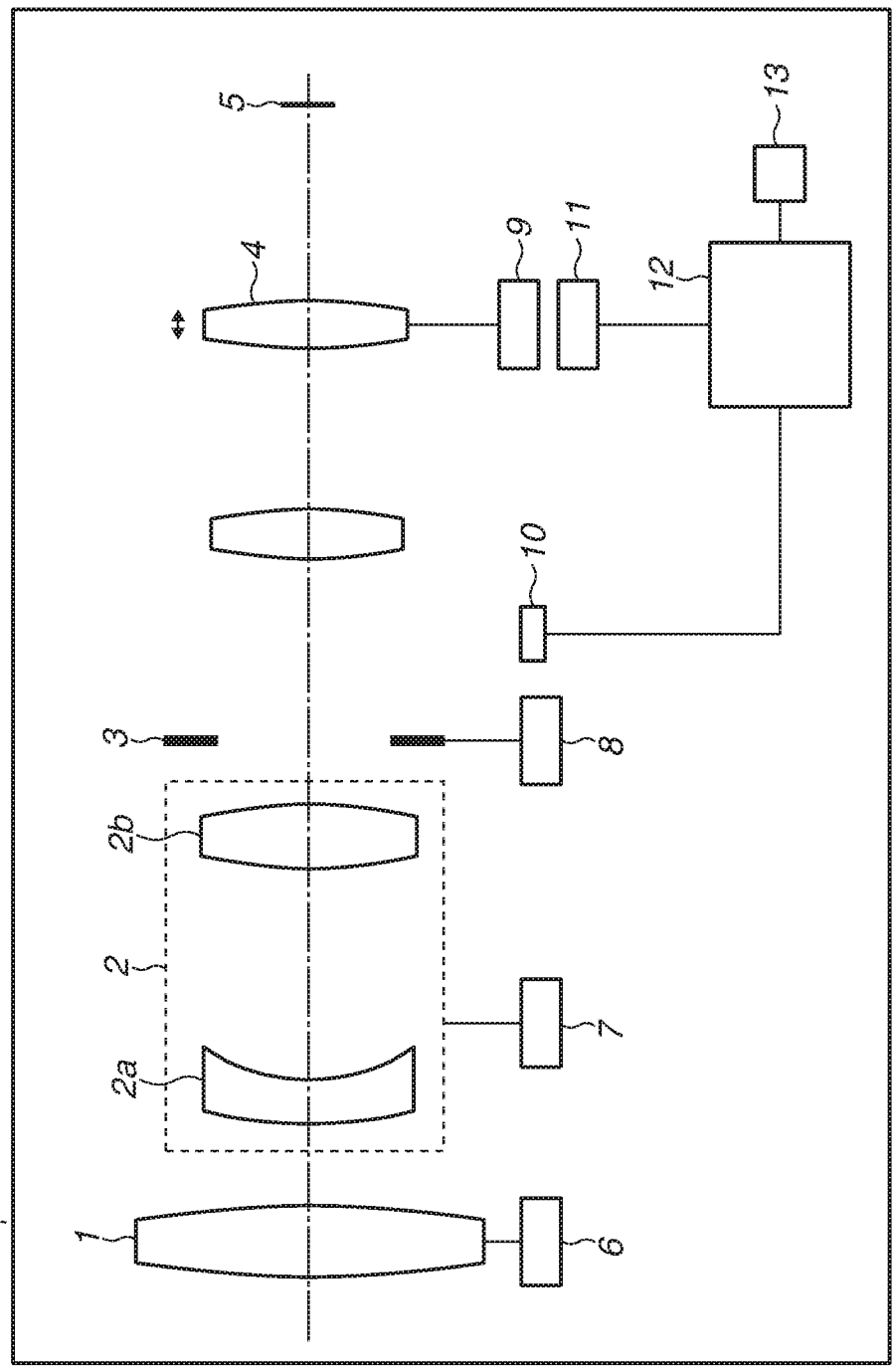
FIG. 1 is a diagram illustrating an example of a configuration of a lens apparatus according to a first exemplary embodiment.

FIG. 1 illustrates an example configuration of a lens apparatus according to a first exemplary embodiment. In FIG. 1, a lens apparatus 0 (also referred to as zoom lens apparatus) includes a focus lens unit 1 that does not move for varying magnification and that has a focusing function, and a plurality of variable magnification lens units 2 that move in an optical axis direction for varying magnification. The variable magnification lens units 2 include at least a variable magnification lens unit 2a mainly in charge of a magnification-varying function and a variable magnification lens unit 2b in charge of correcting (compensating) variation (movement) of an image plane along with the magnification variation. The lens apparatus 0 includes an aperture stop 3, and a correction lens unit 4 that is movable in the optical axis direction to correct a focal position shift. In the present exemplary embodiment, these elements 1 to 4 constitute the lens apparatus (zoom lens) 0.

The lens apparatus 0 includes an image plane 5. When the lens apparatus 0 constitutes an image pickup apparatus, an image pickup element is arranged on the image plane 5. The lens apparatus 0 includes a drive unit 6 to move sub-lens units constituting the focus lens unit 1. The drive unit 6 is composed of, for example, a cam mechanism, an actuator such as a motor to drive the cam mechanism, and a drive circuit to drive the actuator. The lens apparatus 0 includes a drive unit 7 to move the variable magnification lens units 2. The drive unit 7 can be composed of, for example, the same constituent elements as those of the drive unit 6 to move the focus lens unit 1. The lens apparatus 0 includes a drive unit 8 that adjusts an aperture diameter of the aperture stop 3. The drive unit 8 can be composed of, for example, the same constituent elements as those of the drive unit 6 to move the focus lens unit 1. The lens apparatus 0 includes a drive unit 9 to move the correction lens unit 4. The drive unit 9 can be composed of, for example, the same constituent elements as those of the drive unit 6 to move the focus lens unit 1. The lens apparatus 0 includes an atmospheric pressure measurement unit 10 that measures atmospheric pressure inside the lens apparatus 0. The lens apparatus 0 includes a detection unit 11 that detects the state (position and rotation angle) of the cam mechanism for the correction lens unit 4. The lens apparatus 0 includes a control unit 12 (also referred to as a controller) that controls various types of processing performed for the lens apparatus 0. The control unit 12 can be composed of a single processor or multiple processors (central processing unit (CPU) or the like) and a single memory or a plurality of memories. The lens apparatus 0 includes a storage unit 13 that stores correction information for correcting (reducing) change in a focal position due to change in an atmospheric pressure.

As described above, the lens apparatus 0 includes the correction lens unit 4 that moves in the optical axis direction to correct (reduce) the change in the focal position due to the change in the atmospheric pressure. The lens apparatus 0 further includes the variable magnification lens units 2 that move for the varying magnification (zooming). The lens apparatus 0 satisfies the following inequality (1):

$$0.4 < |fv/fw| < 9 \tag{1}$$

where a focal length of one of the variable magnification lens units having a smallest absolute value of a focal length, among the variable magnification lens units 2, is fv, and a focal length of the lens apparatus 0 at a wide-angle end is fw. The lens apparatus 0 can correct (reduce) focus shift due to the change in the atmospheric pressure with ease by satisfying the inequality (1).

The principle of how the focus shift occurs due to the change in the atmospheric pressure will be described below. In general, a refractive index of a substance changes with the change in the atmospheric pressure. An absolute refractive index of glass remains virtually unchanged except for a case in which atmospheric pressure is extremely higher than 1 atmospheric pressure. On the other hand, a refractive index of air significantly changes depending on atmospheric pressure according to the following Edlén Equation (2):

$$n = 1 + 3.83639 \times 10^{-7} \times \\ 0.75P \left\{ \frac{1 + 0.75P(0.817 - 0.0133T) \times 10^{-6}}{1 + 0.003661T} \right\} - 5.607943 \times \\ 10^{-10} H (4.07859739 + 0.44301857T + 0.00232093T^2 + 0.00045785T^3) \tag{2}$$

In the Equation (2), n is a refractive index, P is an atmospheric pressure (hPa), T is a temperature (° C.), and H is a humidity (%). Specifically, the absolute refractive index of the air is 1.000188 at about 0.7 atmospheric pressure (711 hPa), and 1.000000 at 0 atmospheric pressure (vacuum state) while it is 1.000267 at 1 atmospheric pressure (1013 hPa).

In this manner, when the atmospheric pressure changes, the absolute refractive index of the glass of the zoom lens remains virtually unchanged, and only the absolute refractive index of the air significantly changes. As a result, a difference between the refractive index of the glass and that of the air changes with the change in the atmospheric pressure. This causes the focal position of the lens apparatus 0 to change.

The atmospheric pressure changes with an altitude (also referred to as height above sea level) according to the following expression (3):

$$P = 1013.25 \times \left\{ 1 - \frac{0.0065h}{T + 0.0065h + 273.15} \right\}^{5.257} \tag{3}$$

In this expression (3), h is a height above sea level (m). It is found from the expression (3) that atmospheric pressure decreases with increase in height above sea level. Specifically, at a height of 3000 m above sea level, atmospheric pressure is about 0.7 atmospheric pressure (711 hPa). Thus, the focal position of the lens apparatus 0 changes with the change in the altitude.

A focus shift amount of the lens apparatus 0 is a total sum of focus shift amounts due to changes in absolute refractive indexes of respective air lenses included in the lens apparatus 0. The focus shift amount can be defined as a proportional relationship by the following expression (4):

$$X \propto (1 - \beta_{air})^2 \times \beta r^2 / f_{air} \tag{4}$$

where the focus shift amount due to the change in the absolute refractive index of each air lens is X.

In this expression (4), βair is a lateral magnification of each air lens, βr is a lateral magnification of the entire optical system on an image side (rear side) of each air lens, and fair is a focal length of each air lens. It can be said from the expression (4) that the focus shift amount caused by the air lens becomes larger as the focal length fair is shorter, an absolute value of the lateral magnification βair is larger, and an absolute value of the lateral magnification βr of the entire optical system on the image side of the air lens is larger.

In a condenser lens system, in a case of an optical system, such as a fixed focal length lens system, where an interval between pieces of glass (between lenses) is small, a composite focal length of the air lens is about a focal length of the condenser lens system×−1, and thus an air lens system does not have extremely high refractive power. Accordingly, even when the refractive index of the air lens system changes, a value of change in a refractive power of the air lens system is not extremely high, so that the focus shift amount due to the change in the atmospheric pressure is relatively small.

On the other hand, in a zoom lens system, an interval between lens units and a lateral magnification of each lens unit change significantly depending on a focal length. Thus, the zoom lens system has a tendency to have a focal length at which the focus shift amount due to the change in the atmospheric pressure becomes excessively large, or a tendency in which the focus shift amount due to the change in the atmospheric pressure excessively changes depending on the focal length. In particular, when a main variable magnification lens unit has high refractive power and subsequent lens units each have high refractive power, refractive power of which has high refractive power reverse to that of the main variable magnification lens unit so as to cancel the refractive power of the main variable magnification lens unit, the above-mentioned tendency increases. The main variable magnification lens unit is a variable magnification lens unit having the highest magnification variation ratio (absolute value of ratio of lateral magnification at telephoto end to lateral magnification at wide-angle end) among the variable magnification lens units 2 that move for varying magnification.

Since the main variable magnification lens unit has high refractive power, the air lens included therein also has high refractive power. Similarly, since the subsequent lens units have high refractive power, the air lenses included therein also have high refractive power. The focus shift amount as a whole has a relationship in which a focus shift amount caused by the air lens having high refractive power in the main variable magnification lens unit and a focus shift amount caused by the air lenses having high refractive power (sign of refractive power is reversed to that of the main variable magnification lens unit) in the subsequent lens units cancel each other.

On a focal length basis, at the wide-angle end, an absolute value of the lateral magnification βair of the air lens in the main variable magnification lens unit is small, so that the focus shift amount due to the air lens in the main variable magnification lens unit is small, according to the expression (4). Thus, at the wide-angle end, the focus shift amount due to the air lenses in the lens units located on the image side of the main variable magnification lens unit becomes dominant. As described above, the air lenses in the lens units located on the image side of the main variable magnification lens unit have high refractive power, so that the focus shift amount tends to be large at the wide-angle end. In particular, when compared with a fixed focal length lens having the same focal length as that of the zoom lens at the wide-angle end, the tendency is apparent. While the zoom lens has typically includes the focus lens unit that moves for focusing, there is a zoom lens that includes a focus lens unit that serves a focusing function at the telephoto end, and that does not serve the focusing function at the wide-angle end. In such a zoom lens, the focus shift amount at the wide-angle end can cause the image capturing to be difficult.

Increase in focal length from the wide-angle end to the telephoto end increases the absolute value of the lateral magnification βair of the air lens in the main variable magnification lens unit. In this case, the focus shift amount due to the air lens in the main variable magnification lens unit increases, according to the expression (4). As a result, the focus shift amount due to the change in the atmospheric pressure significantly changes depending on the focal length.

As described above, when the zoom lens (lens apparatus) 0 including the variable magnification lens unit having high refractive power according to the present exemplary embodiment is used under an atmospheric pressure environment different from the normal atmospheric pressure environment, the focal position shift along with the change in the atmospheric pressure can be excessively large. The inequality (1) can be the following inequality (1a).

$$0.6 < |fv/fw| < 7 \qquad (1a)$$

Further, the following inequality (5) is satisfied:

$$0.4 < |fair\_t/fw| < 6 \qquad (5)$$

where a composite focal length of an air lens included in one of the variable magnification lens units having a smallest absolute value of the composite focal length among the variable magnification lens units 2 that move for varying magnification is fair_t. The focal length fair_t is defined by the following expression:

$$\text{fair\_t} = \cfrac{1}{\cfrac{1}{\text{fair\_1}} + \cfrac{1}{\text{fair\_2}} + \cfrac{1}{\text{fair\_3}} + \cfrac{1}{\text{fair\_4}} + \cdots} = \cfrac{1}{\Sigma \cfrac{1}{\text{fair\_i}}}$$

where focal lengths of air lenses (typically i-th air lens) constituting a lens unit are fair_1, fair_2, fair_3, fair_4, (fair_i in general expression).

The focal length fair_i of the i-th air lens is defined by the following expression:

$$\text{fair\_i} = \cfrac{1}{\cfrac{Nair - N1}{r1} + \cfrac{N2 - Nair}{r2} - \cfrac{d}{Nair} \times \cfrac{Nair - N1}{r1} \times \cfrac{N2 - Nair}{r2}}$$

where definitions of the character strings are as follows:
N1: a refractive index of glass adjacent to the i-th air lens on an object side
r1: a curvature radius of a surface of the i-th air lens on the object side
N2: a refractive index of glass adjacent to the i-th air lens on an image side
r2: a curvature radius of a surface of the i-th air lens on the image side
Nair: A refractive index of the i-th air lens
d: a thickness on the optical axis of the i-th air lens.
When an absolute value of the focal length fair_t is small, i.e., an absolute value of refractive power of the air lens included in the variable magnification lens unit having the focal length fair_t is large, the focal position shift can be large as described above.

The inequality (5) cam be the following inequality (5a):

$$0.6 < |fv/fw| < 4 \qquad (5a)$$

The lens apparatus 0 according to the present exemplary embodiment satisfies the following inequality (6):

$$2 < |βt/βw| \qquad (6)$$

where βw is a lateral magnification, at the wide-angle end, of one of the variable magnification lens units having a largest absolute value of a magnification ratio (also referred to as a zoom ratio), among the variable magnification lens units 2 that move for varying magnification, and βt is a lateral magnification, at the telephoto end, of the one of the variable magnification lens units. In this inequality (6), the magnification ratio is defined by a ratio of the lateral magnification at the telephoto end to the lateral magnification at the wide-angle end.

When the magnification ratio of the lens unit that moves for varying magnification is high, an amount of change of the lateral magnification βair of the air lens in the lens unit is also large. Thus, the focus shift amount due to the air lens in the lens unit is also large according to the expression (4). In other words, the focus shift amount due to the change in the atmospheric pressure changes significantly depending on the change in the focal length. The inequality (6) can be the following inequality (6a):

$$2.5 < |\beta t/\beta w| \tag{6a}$$

The lens apparatus 0 according to the present exemplary embodiment includes the atmospheric pressure measurement unit 10 (a measurement unit also referred to as a measurement device) that measures an atmospheric pressure around or inside the lens apparatus 0. The lens apparatus 0 stores in the storage unit 13 information (also referred to as correction information) for acquiring a movement amount of the correction lens unit 4 to correct (reduce) the focus shift. The correction information can be information (also referred to as first correction information) indicating a correspondence relationship between the change in the atmospheric pressure and the change in the focal position. The control unit 12 can acquire a correction amount (or movement amount) of the correction lens unit 4 from atmospheric pressure measured by the atmospheric pressure measurement unit 10 and the first correction information ('acquire' can be replaced by 'obtain'). An altitude measurement unit or a global positioning system (GPS), instead of the atmospheric pressure measurement unit 10 can be used. When the altitude measurement unit is used, an altitude measured by the altitude measurement unit can be converted to an atmospheric pressure. When the GPS is used, an altitude acquired by the GPS is to be converted to atmospheric pressure.

The control unit 12 acquires a correction amount from the information stored in the storage unit 13 based on the acquired atmospheric pressure, and inputs the correction amount to the drive unit 9. The drive unit 9 moves the correction lens unit 4 in the optical axis direction based on the correction amount acquired from the control unit 12 to correct the focus shift. The correction information stored in the storage unit 13 may be information in a table form or information in a functional form.

Figure 2:
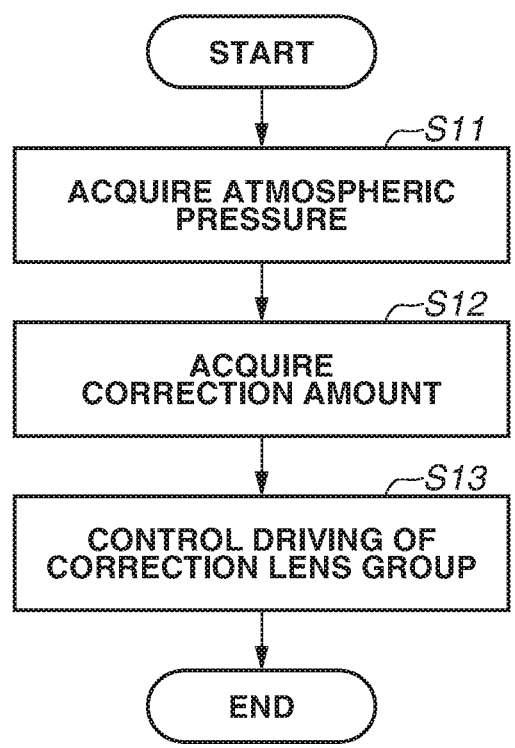
FIG. 2 is a flowchart illustrating an example of a processing flow according to the first exemplary embodiment.

FIG. 2 is a flowchart illustrating a processing flow according to the first exemplary embodiment. The processing is performed by the control unit 12 executing a control program. After the start of the processing in FIG. 2, in step S11, information about atmospheric pressure measured by the atmospheric pressure measurement unit 10 is acquired. In step S12, a correction amount (movement amount) of the correction lens unit 4 is acquired based on the information about atmospheric pressure acquired in step S11 and correction information stored in the storage unit 13. In step S13, driving (positioning) of the correction lens unit 4 is controlled (position is changed) by the drive unit 9 and the detection unit 11, so that the change in the focal position due to the change in the atmospheric pressure is corrected. Then the processing ends. The atmospheric pressure may be acquired through the altitude measurement unit or the GPS, as described above. In this case, the correction information stored in the storage unit 13 may be information corresponding to an altitude or information with an altitude serving as an argument.

When an amount of change in the atmospheric pressure with respect to the reference atmospheric pressure is less than a predetermined threshold value L, the lens apparatus 0 can cause the correction lens unit 4 not to move by regarding an amount of change in the focal position (correction amount or movement amount of correction lens unit 4) as 0 (A threshold value is also referred to simply as a threshold). In one embodiment, the threshold value L satisfies the following inequality (7):

$$0.5 \text{ hPa} < L < 100 \text{ hPa} \tag{7}$$

In another embodiment, the inequality (7) can be the following inequality (7a):

$$5 \text{ hPa} < L < 50 \text{ hPa} \tag{7a}$$

As described above, the lens apparatus that is beneficial in reduction of unnecessary driving and control stability can be achieved by driving the correction lens unit only when the focus shift amount is the threshold value L or larger.

The first correction information may be not only the amount of change in the atmospheric pressure but also the focal length as a variable (argument). As a result, even when the focus shift amount due to the change in the atmospheric pressure significantly changes depending on the focal length, the lens apparatus 0 can perform correction more appropriately. The lens apparatus 0 may include, other than the correction lens unit 4, a plurality of ones of the correction lens unit that move in the optical axis direction for correcting the change in the focal position due to the change in the atmospheric pressure. With this configuration, even the lens apparatus in which the focus shift due to the change in the atmospheric pressure significantly changes with the change in the focal length can perform the correction appropriately using a correction lens unit in which sensitivity of correction to the change in the focal position matches with the amount of change in the focal position. In the correction lens unit, the sensitivity of correction to the change in the focal position refers to an amount of change in a focal position per unit amount of movement of the correction lens unit. Simultaneously moving a plurality of ones of the correction lens unit enables more accurate correction even when the focus shift amount is large.

The lens apparatus 0 may have different correspondence relationships (movement loci), between respective positions of each variable magnification lens unit (e.g., at least variable magnification lens unit (compensator unit) 2b) that moves for varying magnification and the focal lengths, for each of different values of atmospheric pressure. Accordingly, even when the focus shift amount due to the change in the atmospheric pressure significantly changes depending on the change in the focal position, the lens apparatus 0 can be beneficial in correcting (reducing) the focal position shift along with the change in the focal length by changing a locus of each variable magnification lens unit that moves for varying magnification.

The image pickup apparatus, which is beneficial in reducing the focal position shift due to the change in the atmospheric pressure, can be provided by configuring the image pickup apparatus to include the lens apparatus 0 and the image pickup element (included in camera apparatus) arranged on the image plane of the lens apparatus 0. As described above, according to the present exemplary embodiment, the lens apparatus, which is beneficial in reducing the focal position shift due to the change in the atmospheric pressure, for example, can be provided.

Figure 3:
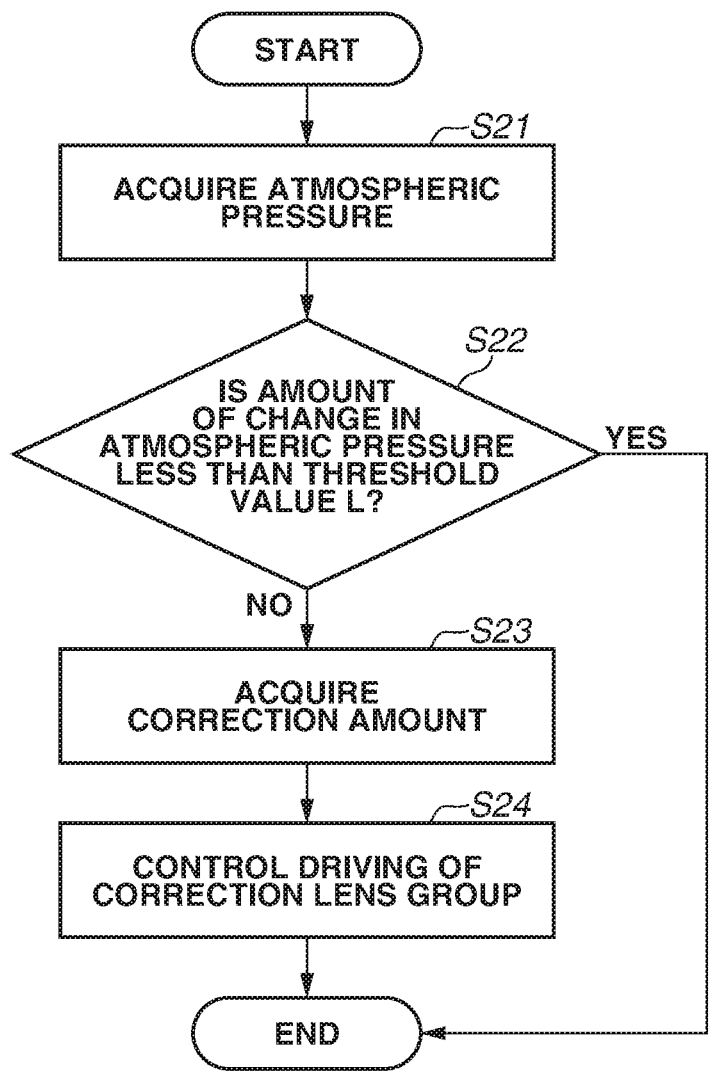
FIG. 3 is a flowchart illustrating an example of a processing flow according to a second exemplary embodiment.

An example configuration of the lens apparatus 0 according to a second exemplary embodiment is similar to that of the first exemplary embodiment. In the present exemplary embodiment, the flow of processing including processing performed when an amount of change in an atmospheric pressure is less than the threshold value L will be described in detail. FIG. 3 is a flowchart illustrating a processing flow according to the present exemplary embodiment. The processing is performed by the control unit 12 executing the control program. When the processing in FIG. 3 is started, first, in step S21, information about atmospheric pressure measured by the atmospheric pressure measurement unit 10 is acquired. In step S22, determination is made as to whether an amount of change in an atmospheric pressure from the atmospheric pressure acquired at the previous time is less than a threshold value (threshold value L). The threshold value L can be the same as that described in the first exemplary embodiment. When the amount of change is less than the threshold value L (YES in step S22), the processing ends. When the amount of change is not less than the threshold value L (NO in step S22), the processing can proceed to step S23. In step S23, a correction amount (movement amount) of the correction lens unit 4 is acquired based on the information about atmospheric pressure acquired in step S21 and correction information stored in the storage unit 13. In step S24, driving (positioning) of the correction lens unit 4 is controlled (position is changed) by the drive unit 9 and the detection unit 11, so that the change in the focal position due to the change in the atmospheric pressure is corrected. Then the processing ends. According to the present exemplary embodiment, the lens apparatus, which is beneficial, for example, in reducing the focal position shift due to the change in the atmospheric pressure can be provided.

Figure 4:
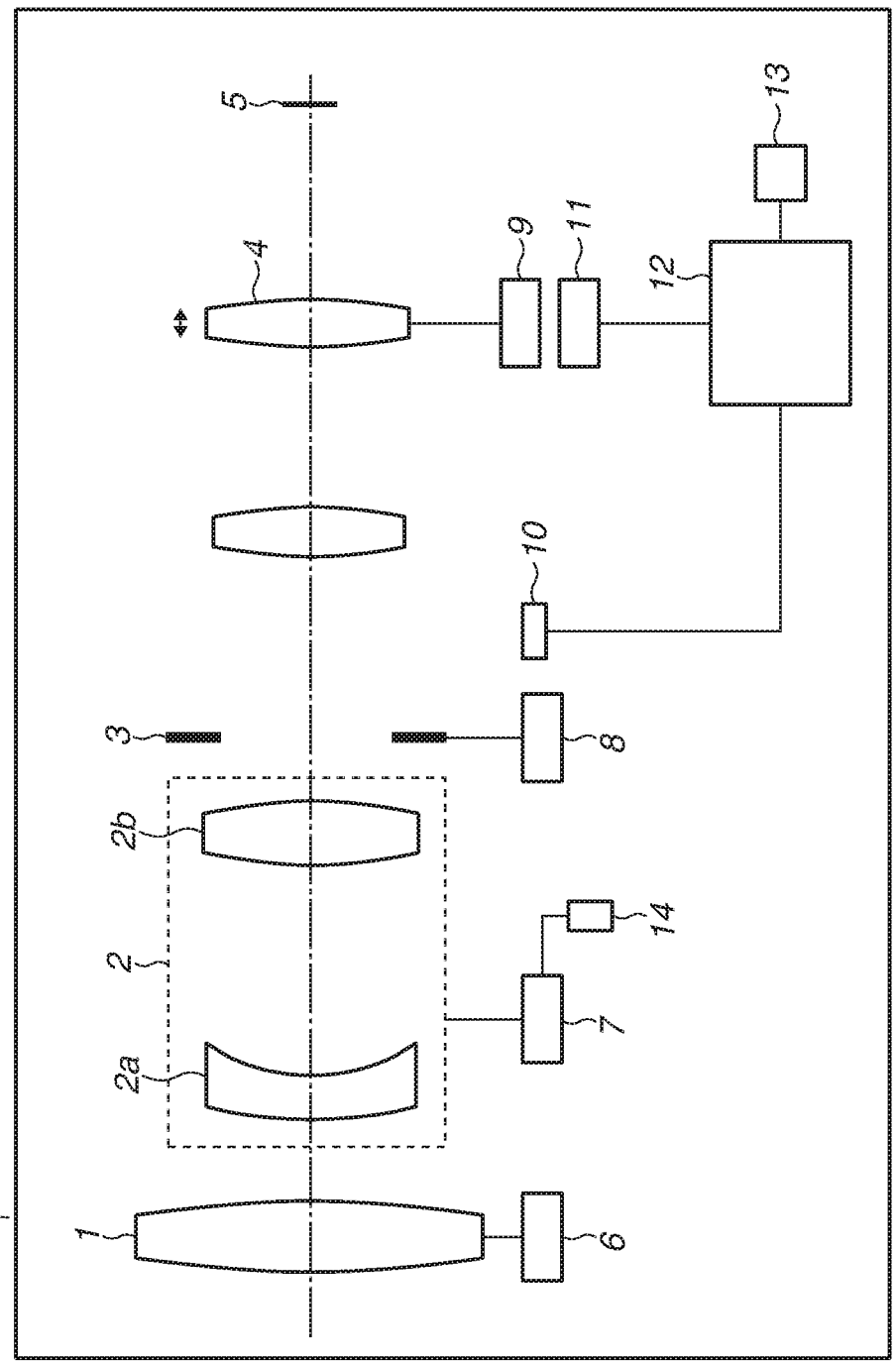
FIG. 4 is a diagram illustrating an example of a configuration of a lens apparatus according to a third exemplary embodiment.

FIG. 4 illustrates an example configuration of a lens apparatus according to a third exemplary embodiment. The present example configuration is different from that of the first exemplary embodiment in the following points:

(A1) The correction information stored in the storage unit 13 supports a change in a position of each variable magnification lens unit.

(A2) The present example configuration includes a state detection unit 14 that detects the state of variable magnification lens unit.

In the lens apparatus 0 according to the present exemplary embodiment, the storage unit 13 stores in advance correction information for correcting the focus shift due to a change in a state of each variable magnification lens unit (e.g., position of cam member to drive variable magnification lens unit or rotation angle). The correction information may be information in a table form or information in a functional form.

Figure 5:
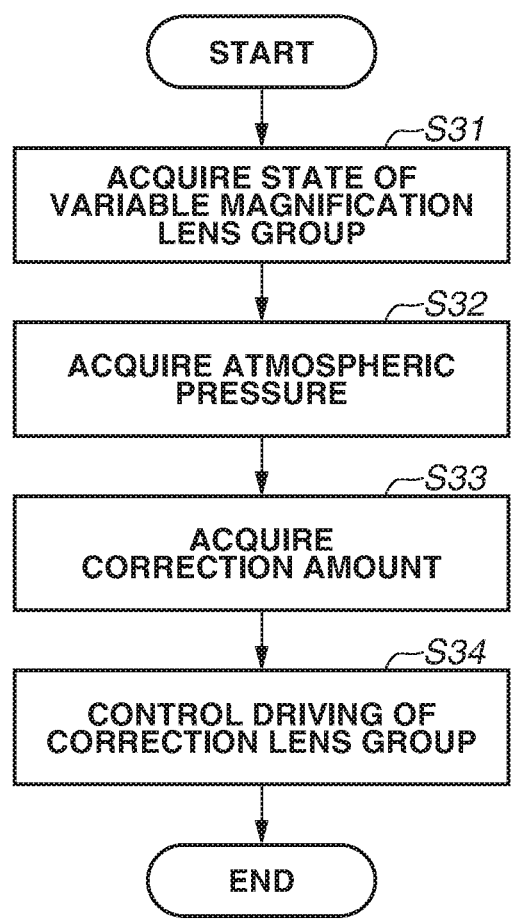
FIG. 5 is a flowchart illustrating an example of a processing flow according to the third exemplary embodiment.

FIG. 5 is a flowchart illustrating an example of a processing flow according to the present exemplary embodiment. The processing is performed by the control unit 12 executing the control program. When the processing in FIG. 5 is started, in step S31, information about the state of each variable magnification lens unit detected by the state detection unit 14 is acquired. In step S32, information about atmospheric pressure measured by the atmospheric pressure measurement unit 10 is acquired. In step S33, a correction amount (movement amount) of the correction lens unit 4 is acquired based on the information about the state acquired in step S31 and the information about atmospheric pressure acquired in step S32 and correction information stored in the storage unit 13. In step S34, driving (positioning) of the correction lens unit 4 is controlled (position is changed) by the drive unit 9 and the detection unit 11, so that the change in the focal position due to the change in the atmospheric pressure is corrected. Then, the processing is ended. According to the present exemplary embodiment, the lens apparatus, which is beneficial, for example, in reducing the focal position shift due to the change in the atmospheric pressure can be provided.

Figure 6:
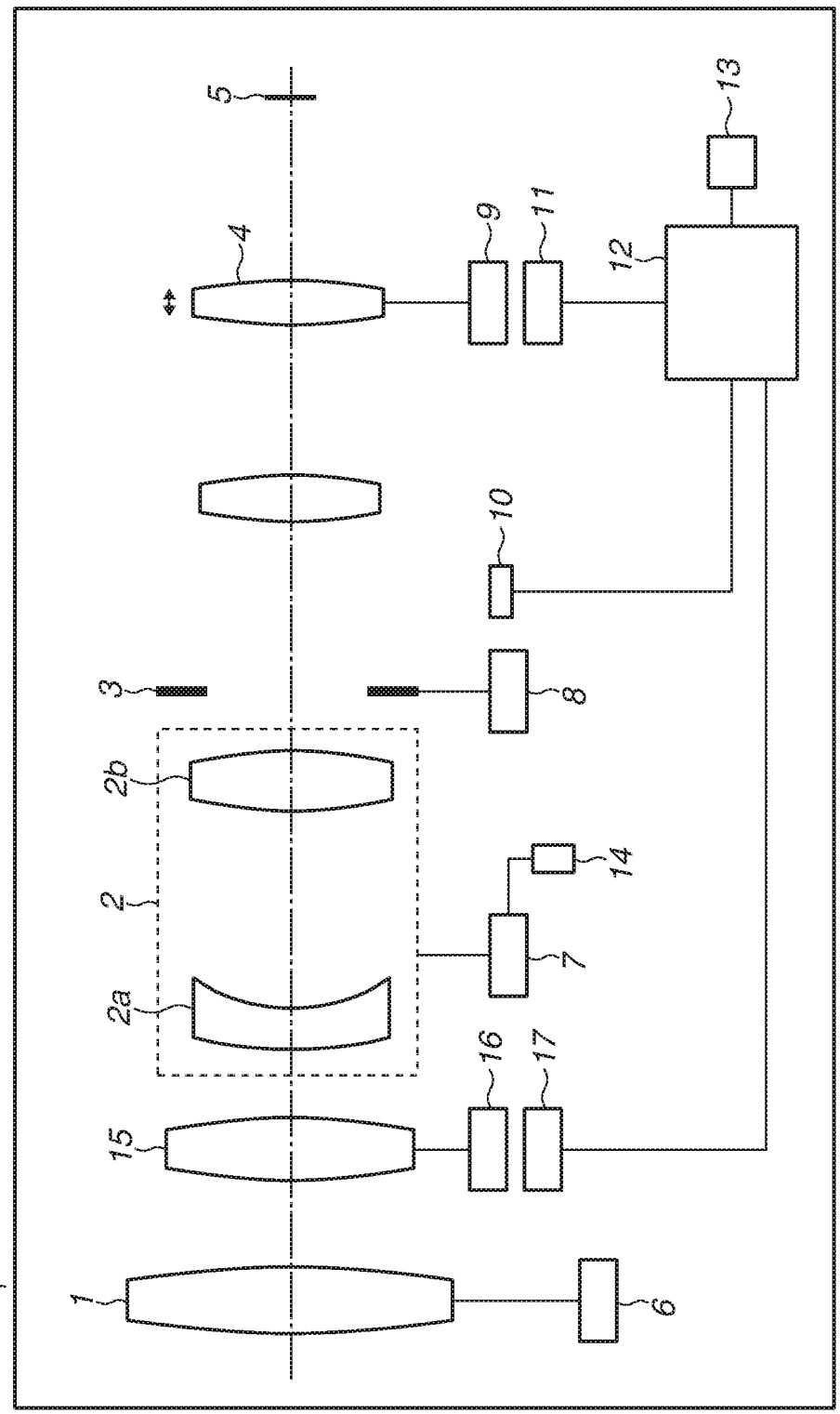
FIG. 6 is a diagram illustrating an example of a configuration of a lens apparatus according to a fourth exemplary embodiment.

FIG. 6 illustrates an example configuration of a lens apparatus according to a fourth exemplary embodiment. The present example configuration is different from that of the third exemplary embodiment in the following points:

(B1) The present example configuration includes a second correction lens unit 15 that is movable in the optical axis direction, a drive unit 16 to move the second correction lens unit 15, and a second detection unit 17 that detects the state of the second correction lens unit 15.

(B2) The storage unit 13 also stores correction information for the second correction lens unit 15.

In the lens apparatus 0 according to the present exemplary embodiment, the storage unit 13 stores in advance a plurality of pieces of correction information (a plurality of ones of the correspondence relationship) respectively corresponding to the correction lens units. The correction information stored in the storage unit 13 may be information in a table form or information in a function form.

Figure 7:
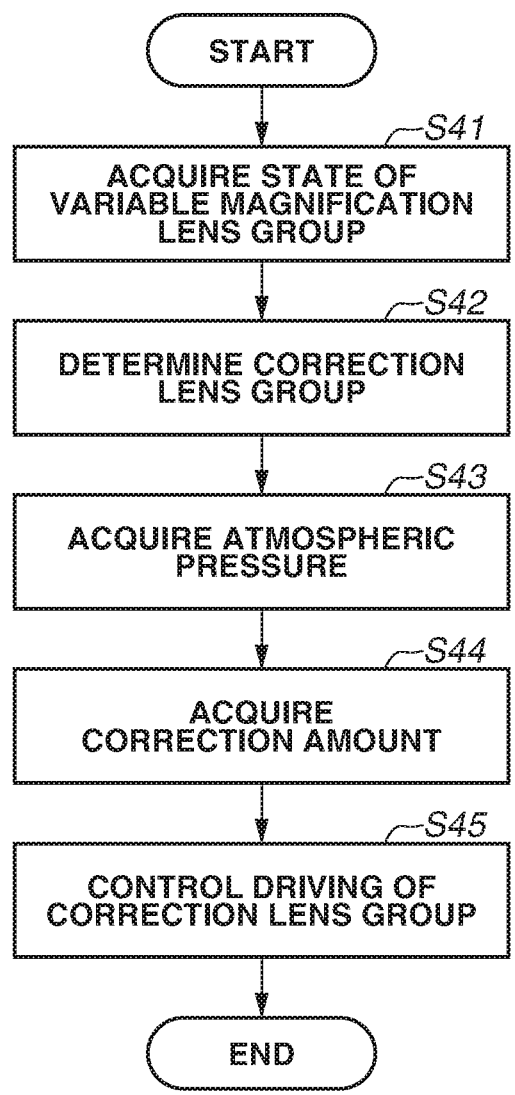
FIG. 7 is a flowchart illustrating an example of a processing flow according to the fourth exemplary embodiment.

FIG. 7 is a flowchart illustrating an example of a processing flow according to the present exemplary embodiment. The processing is performed by the control unit 12 executing the control program. When the processing in FIG. 7 is started, in step S41, information about the state of each variable magnification lens unit detected by the state detection unit 14 is acquired. In step S42, a correction lens unit suitable for the correction is determined based on the information about the state acquired in step S41. In step S43, information about atmospheric pressure measured by the atmospheric pressure measurement unit 10 is acquired. In step S44, a correction amount (movement amount) of the correction lens unit determined in step S42 is acquired based on the information about the state acquired in step S41, the information about atmospheric pressure acquired in step S43, and correction information stored in the storage unit 13. In step S45, driving (positioning) of the correction lens unit 4 determined in step S42 is controlled (position change) by the corresponding drive unit and the corresponding detection unit so that the change in the focal position due to the change in the atmospheric pressure is corrected. Then, the processing is ended. According to the present exemplary embodiment, the lens apparatus, which is beneficial, for example, in reducing the focal position shift due to the change in the atmospheric pressure can be provided.

Figure 8:
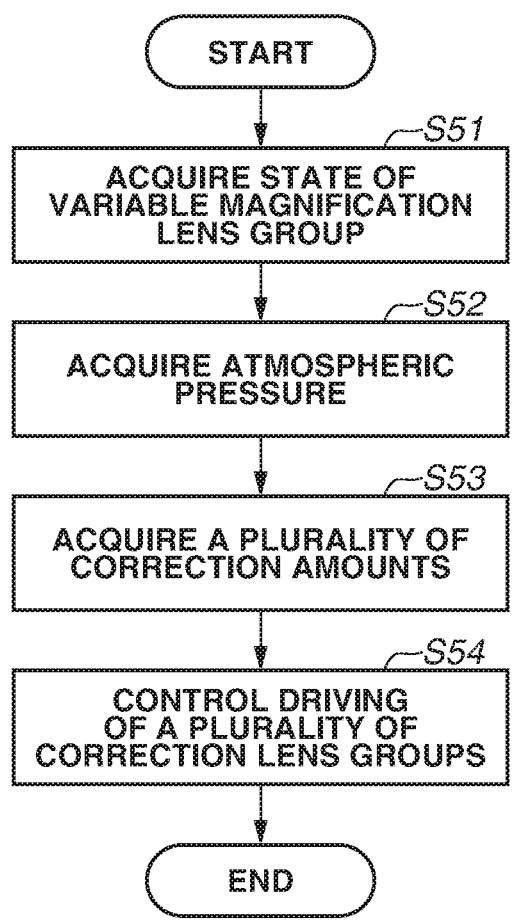
FIG. 8 is a flowchart illustrating an example of a processing flow according to a fifth exemplary embodiment.

An example configuration of the lens apparatus 0 according to a fifth exemplary embodiment is similar to that of the fourth exemplary embodiment. FIG. 8 is a flowchart illustrating an example of a processing flow according to the present exemplary embodiment. The processing is performed by the control unit 12 executing the control program. When the processing in FIG. 8 is started, in step S51, information about the state of each variable magnification lens unit detected by the state detection unit 14 is acquired. In step S52, information about atmospheric pressure measured by the atmospheric pressure measurement unit 10 is acquired. In step S53, a correction amount (movement amount) of each correction lens unit is acquired based on the information about the state acquired in step S51, the information about atmospheric pressure acquired in step S52, and correction information stored in the storage unit 13. In step S54, driving (positioning) of each correction lens unit is controlled (position change) by the corresponding drive unit and the corresponding detection unit so that the change in the focal position due to the change in the atmospheric pressure is corrected. Then, the processing is ended. According to the present exemplary embodiment, the lens apparatus, which is beneficial, for example, in reducing the focal position shift due to the change in the atmospheric pressure can be provided.

Figure 9:
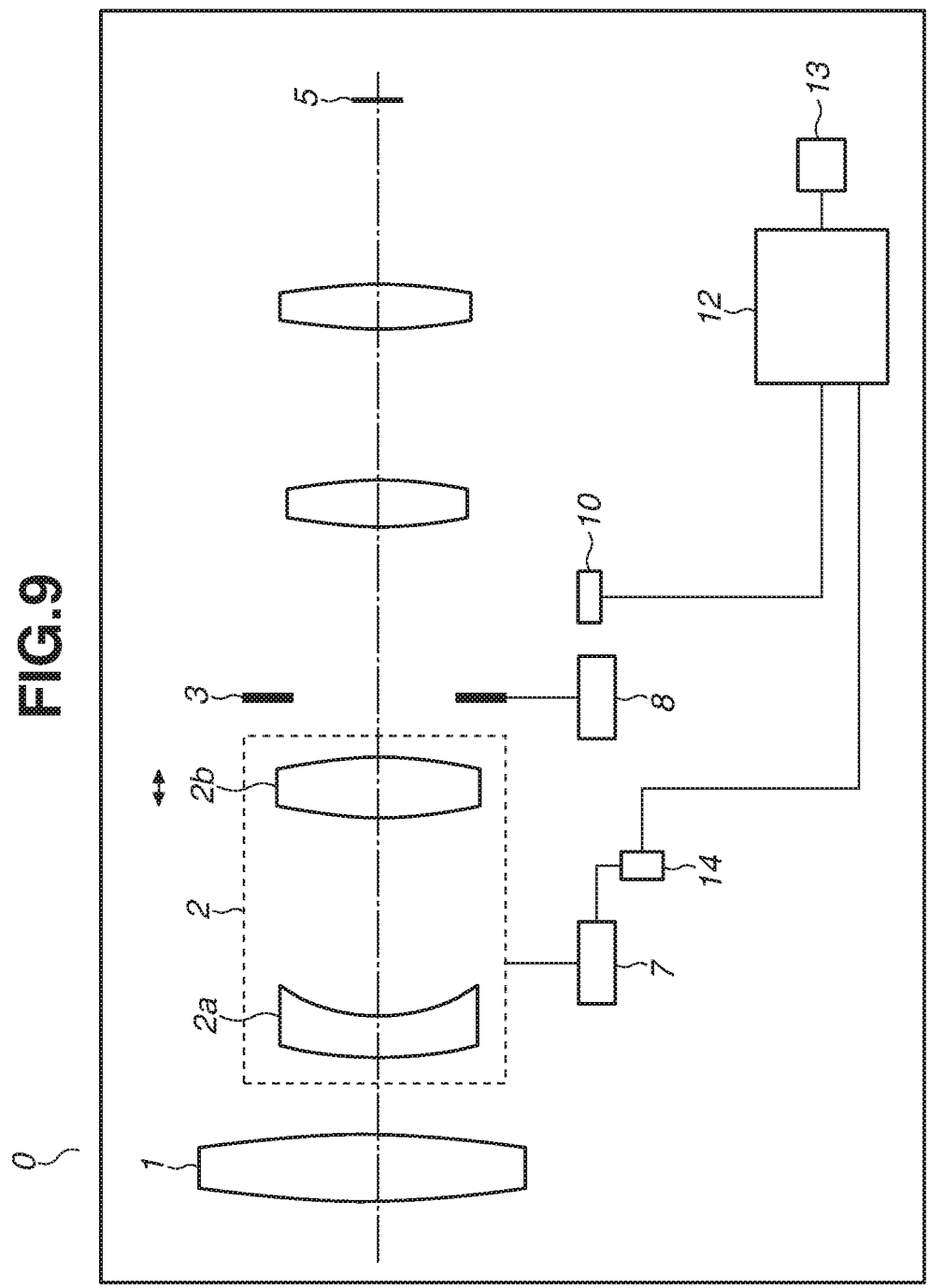
FIG. 9 is a diagram illustrating an example of a configuration of a lens apparatus according to a sixth exemplary embodiment.

FIG. 9 illustrates an example configuration of a lens apparatus according to a sixth exemplary embodiment. The present example configuration is different from that of the second exemplary embodiment in the following points.

In the lens apparatus 0 according to the present exemplary embodiment, the storage unit 13 stores in advance information about a plurality of movement loci of the respective variable magnification lens units 2a and 2b (at least variable magnification lens unit 2b) corresponding to respective different values of atmospheric pressure. In other words, in the present exemplary embodiment, the variable magnification lens units 2a and 2b (at least variable magnification lens unit 2b) constitute the correction lens unit that are movable in the optical axis direction. The information about the movement loci (correction information) stored in the storage unit 13 may be information in a table form or information in a functional form.

Figure 10:
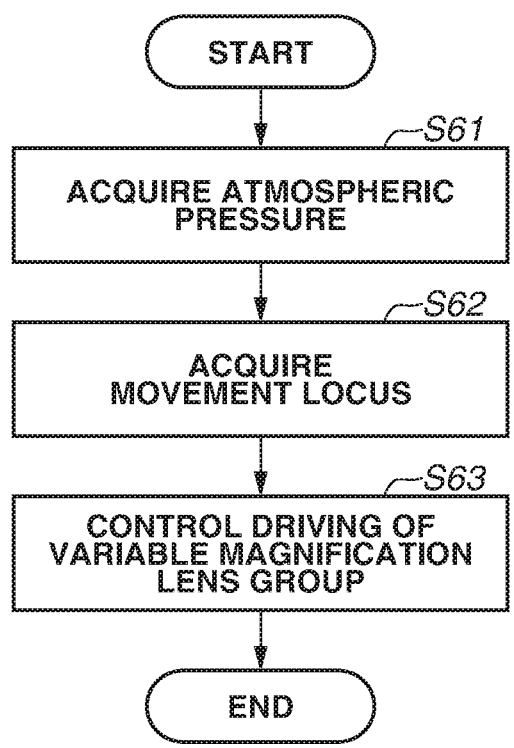
FIG. 10 is a flowchart illustrating an example of a processing flow according to the sixth exemplary embodiment.

FIG. 10 is a flowchart illustrating an example of a processing flow according to the present exemplary embodiment. The processing is performed by the control unit 12 executing the control program. When the processing in FIG. 10 is started, in step S61, information about atmospheric pressure measured by the atmospheric pressure measurement unit 10 is acquired. In step S62, information about movement loci of the variable magnification lens units 2a and 2b is acquired based on the information about atmospheric pressure acquired in step S61 and information about the plurality of movement loci stored in the storage unit 13. In step S63, driving (position) of the variable magnification lens units 2a and 2b is controlled (position change) based on the information about the respective movement loci, so that the change in the focal position due to the change in the atmospheric pressure is corrected. Then, the processing is ended. According to the present exemplary embodiment, the lens apparatus, which is beneficial, for example, in reducing the focal position shift due to the change in the atmospheric pressure can be provided.

Numerical examples according to the aspect of the embodiments will be described below.

First Numerical Example

Figure 11:
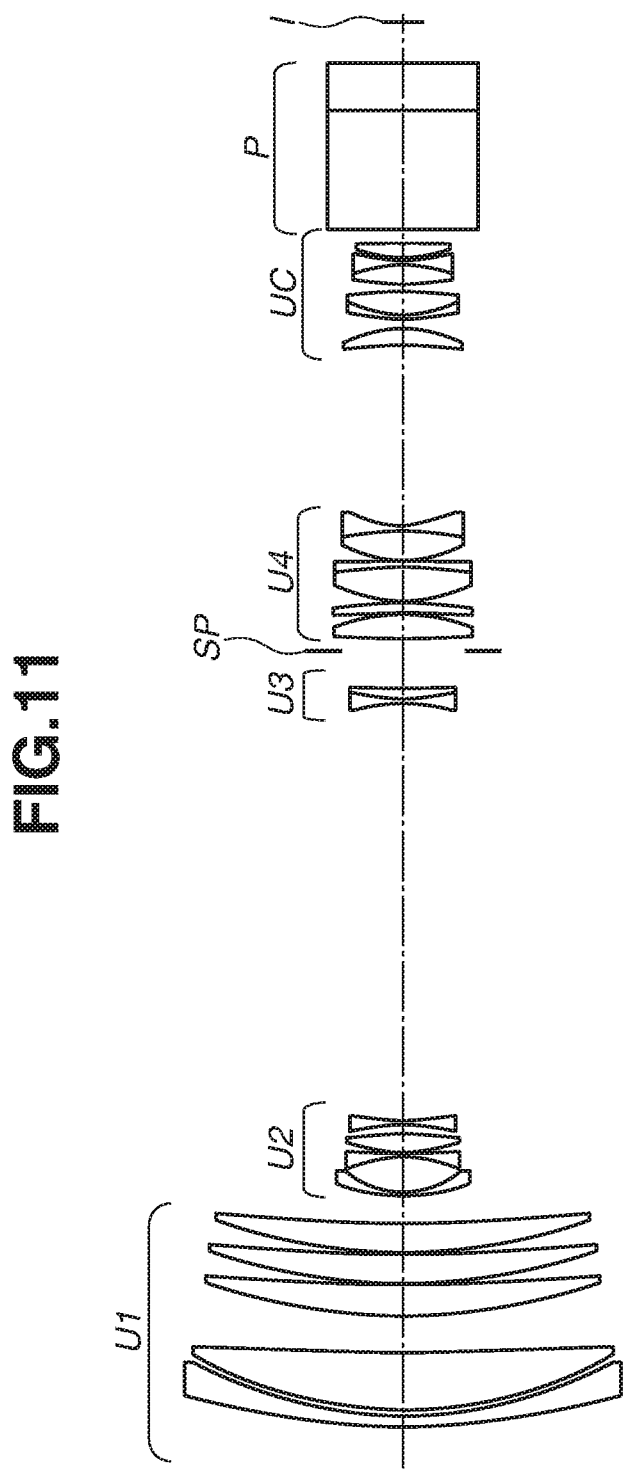
FIG. 11 is a cross sectional diagram illustrating a zoom lens according to a first numerical example at the wide-angle end and in an infinity in-focus state.

FIG. 11 is a cross sectional diagram illustrating an optical system (zoom lens) of a lens apparatus according to a first numerical example at the wide-angle end and in an infinity in-focus state. The zoom lens will be described sequentially from the object side to the image side with reference to FIG. 11.

The zoom lens includes a first lens unit U1 that does not move for varying magnification (zoom adjustment) and has positive reflective power. Part of the first lens unit U1 moves from the image side to the object side for focusing on an infinite distance to a finite distance (focus adjustment). The zoom lens includes a second lens unit (variator lens unit) U2 that moves toward the image side for varying magnification from the wide-angle end (short focal length end) to the telephoto end (long focal length end) and that has negative refractive power. The zoom lens includes a third lens unit (compensator lens unit) U3 that moves for varying magnification and that has negative refractive power. The zoom lens includes an aperture stop SP. The zoom lens includes a fourth lens unit U4 that does not move for varying magnification. The zoom lens includes a correction lens unit (also referred to as a fifth lens unit) UC that corrects the change in the focal position due to the change in the atmospheric pressure. The zoom lens includes an optical block (also referred to as a sixth lens unit) P including a prism and an optical filter. The zoom lens includes an image plane I that is the image plane of the zoom lens, and a light-receiving surface of the image pickup element (photoelectric conversion element) of the camera apparatus is arranged thereat.

In the present numerical example, the second lens unit U2 has, among the lens units that move for varying magnification, the smallest absolute value of the focal length, the smallest absolute value of the composite focal length of the air lens, and the largest absolute value of the magnification ratio. An amount of change in a focal position of the zoom lens according to the present numerical example at 0.7 atmospheric pressure with respect to the focal position at 1 atmospheric pressure serving as a reference is −45 μm at the wide-angle end, and −358 μm at the telephoto end. A movement amount in the optical axis direction of the correction lens unit UC for correcting the amount of change is +45 μm at the wide-angle end, and +358 μm at the telephoto end.

Second Numerical Example

Figure 12:
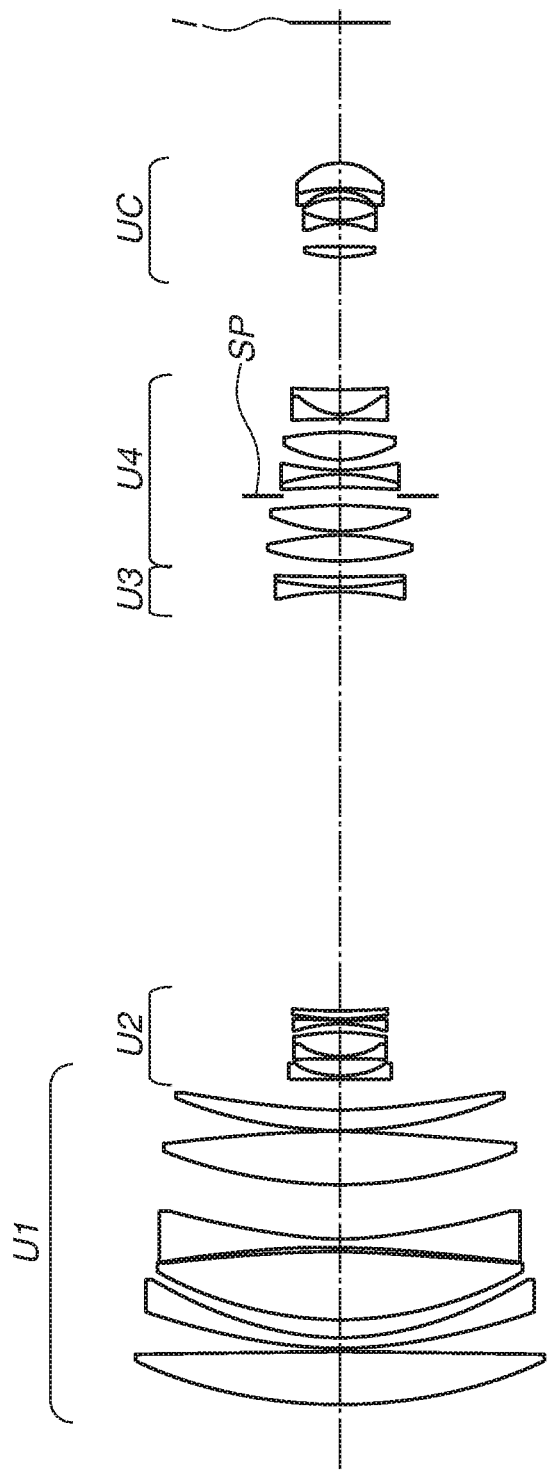
FIG. 12 is a cross sectional diagram illustrating a zoom lens according to a second numerical example at the wide-angle end and in the infinity in-focus state.

FIG. 12 is a cross sectional diagram illustrating an optical system (zoom lens) of a zoom lens apparatus according to a second numerical example at the wide-angle end and in the infinity in-focus state. The zoom lens will be described sequentially from the object side to the image side with reference to FIG. 12.

The zoom lens includes a first lens unit U1 that does not move for varying magnification (zoom adjustment) and has positive reflective power. Part of the first lens unit U1 moves from the image side to the object side for focusing on the infinite distance to the finite distance (focus adjustment). The zoom lens includes a second lens unit (variator lens unit) U2 that moves toward the image side for varying magnification from the wide-angle end (short focal length end) to the telephoto end (long focal length end) and that has negative refractive power. The zoom lens includes a third lens unit (compensator lens unit) U3 that moves for varying magnification and that has negative refractive power. The zoom lens includes an aperture stop SP. The zoom lens includes a fourth lens unit U4 that does not move for varying magnification. The zoom lens includes a correction lens unit (also referred to as a fifth lens unit) UC that corrects the change in the focal position due to the change in the atmospheric pressure. The zoom lens includes an image plane I that serves as the image plane of the zoom lens, and the light-receiving surface of the image pickup element (photoelectric conversion element) of the camera apparatus is arranged thereat.

In the present numerical example, the second lens unit U2 has, among the lens units that move for varying magnification, the smallest absolute value of the focal length, the smallest absolute value of the composite focal length of the air lens, and the largest absolute value of the magnification ratio. An amount of change in a focal position of the zoom lens according to the present numerical example at 0.7 atmospheric pressure with respect to the focal position at 1 atmospheric pressure serving as a reference is −189 μm at the wide-angle end, and −1256 μm at the telephoto end. A movement amount in the optical axis direction of the correction lens unit UC for correcting the amount of change is −744 μm at the wide-angle end, and −4934 μm at the telephoto end.

Third Numerical Example

Figure 13:
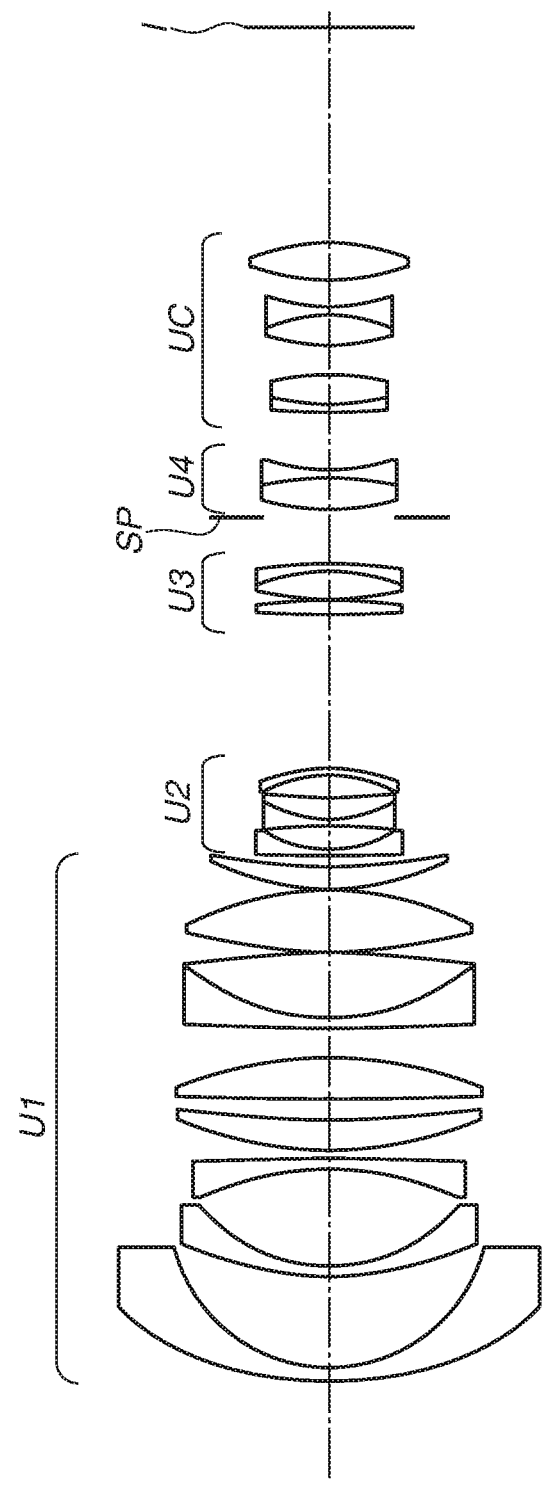
FIG. 13 is a cross sectional diagram illustrating a zoom lens according to a third numerical example at the wide-angle end and in the infinity in-focus state.

FIG. 13 is a cross sectional diagram illustrating an optical system (zoom lens) of a lens apparatus according to a third numerical example at the wide-angle end and in the infinity in-focus state. The zoom lens will be described sequentially from the object side to the image side with reference to FIG. 13.

The zoom lens includes the first lens unit U1 that does not move for varying magnification (zoom adjustment) and has positive reflective power. Part of the first lens unit U1 moves from the image side to the object side for focusing on the infinite distance to the finite distance (focus adjustment). The zoom lens includes the second lens unit (variator lens unit) U2 that moves toward the image side for varying magnification from the wide-angle end (short focal length end) to the telephoto end (long focal length end) and that has negative refractive power. The zoom lens includes a third lens unit (compensator lens unit) U3 that moves for varying magnification and that has positive refractive power. The zoom lens includes an aperture stop SP. The zoom lens includes a fourth lens unit U4 that does not move for varying magnification. The zoom lens includes a correction lens unit (also referred to as a fifth lens unit) UC that corrects the change in the focal position due to the change in the atmospheric pressure. The zoom lens includes the image plane I that serves as the image plane of the zoom lens, and the light-receiving surface of the image pickup element (photoelectric conversion element) of the camera apparatus is arranged thereat.

In the present numerical example, the second lens unit U2 has, among the lens units that move for varying magnification, the smallest absolute value of the focal length, the smallest absolute value of the composite focal length of the air lens, and the largest absolute value of the magnification ratio. An amount of change in a focal position of the zoom lens according to the present numerical example at 0.7 atmospheric pressure with respect to the focal position at 1 atmospheric pressure serving as a reference is −35 μm at the wide-angle end, and −72 μm at the telephoto end. A movement amount in the optical axis direction of the correction lens unit UC for correcting the amount of change is +41 μm at the wide-angle end, and +83 μm at the telephoto end.

Fourth Numerical Example

Figure 14:
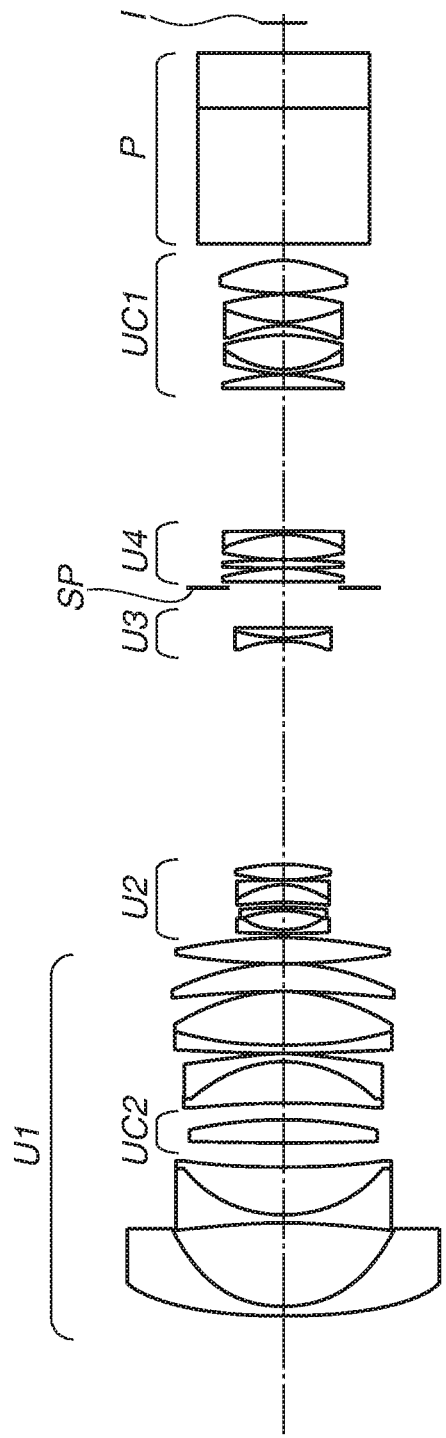
FIG. 14 is a cross sectional diagram illustrating a zoom lens according to a fourth numerical example at the wide-angle end and in the infinity in-focus state.

FIG. 14 is a cross sectional diagram illustrating an optical system (zoom lens) of a lens apparatus according to a fourth numerical example at the wide-angle end and in the infinity in-focus state. The zoom lens will be described sequentially from the object side to the image side with reference to FIG. 14.

The zoom lens includes a first lens unit U1 that does not move for varying magnification (zoom adjustment) and has positive reflective power. The zoom lens includes a second correction lens unit UC2 that serves as part of the first lens unit U1 and that corrects the change in the focal position due to the change in the atmospheric pressure. The second lens unit (variator lens unit) U2 moves toward the image side for varying magnification from the wide-angle end (short focal length end) to the telephoto end (long focal length end) and has negative refractive power. The zoom lens includes a third lens unit (compensator lens unit) U3 that moves for varying magnification and that has negative refractive power. The zoom lens includes an aperture stop SP. The zoom lens includes a fourth lens unit U4 that does not move for varying magnification. The zoom lens includes a first correction lens unit (also referred to as a fifth lens unit) UC1 that corrects the change in the focal position due to the change in the atmospheric pressure. The zoom lens includes an optical block (also called as a sixth lens unit) P including a prism and an optical filter. The zoom lens includes an image plane I that is the image plane of the zoom lens, and the light-receiving surface of the image pickup element (photoelectric conversion element) of the camera apparatus. is arranged thereat In the present numerical example, the second lens unit U2 has, among the lens units that move for varying magnification, the smallest absolute value of the focal length, the smallest absolute value of the composite focal length of the air lens, and the largest absolute value of the magnification ratio. An amount of change in a focal position of the zoom lens according to the present numerical example at 0.7 atmospheric pressure with respect to the focal position at 1 atmospheric pressure serving as a reference is −26 μm at the wide-angle end, and −85 μm at the telephoto end. The first correction lens unit UC1 corrects the focal position at the wide-angle end, and its movement amount in the optical axis direction for the correction is +26 μm. The second correction lens unit UC2 corrects the focal position at the telephoto end, and its movement amount in the optical axis direction for the correction is −44 μm. The lens apparatus according to the present numerical example may switch correction lens units to move depending on a zoom state. The change in the focal position may be corrected by acquiring the movement amount of the first correction lens unit UC1 and the movement amount of the second correction lens unit UC2 depending on the zoom state and moving the first correction lens unit UC1 and the second correction lens unit UC2 simultaneously or in parallel.

Fifth Numerical Example

FIG. 15 is a cross sectional diagram illustrating an optical system (zoom lens) of a lens apparatus according to a fifth numerical example at the wide-angle end and in the infinity in-focus state. The zoom lens will be described sequentially from the object side to the image side with reference to FIG. 15.

The zoom lens includes a first lens unit U1 that does not move for varying magnification (zoom adjustment) and has positive reflective power. Part of the first lens unit U1 moves from the image side to the object side for focusing on the infinite distance to the finite distance (focus adjustment). The zoom lens includes a second lens unit (variator lens unit) U2 that moves toward the image side for varying magnification from the wide-angle end (short focal length end) to the telephoto end (long focal length end) and that has negative refractive power. The zoom lens includes an aperture stop SP. The zoom lens includes a third lens unit U3 that does not move for varying magnification and that has positive refractive power. The zoom lens includes a fourth lens unit (compensator lens unit) U4 that moves for varying magnification and that has positive refractive power. The zoom lens includes an optical block (also referred to as a fifth lens unit) P including a prism and an optical filter. The zoom lens includes an image plane I that serves as the image plane of the zoom lens, and the light-receiving surface of an image pickup element (photoelectric conversion element) of the camera apparatus is arranged.

In the present numerical example, the second lens unit U2 has, among the lens units that move for varying magnification, the smallest absolute value of the focal length, the smallest absolute value of the composite focal length of the air lens, and the largest absolute value of the magnification ratio. In the lens apparatus according to the present numerical example, the fourth lens unit U4 has a plurality of movement loci respectively corresponding to a plurality of ones of the atmospheric pressure different from each other. The movement locus for correcting the change in the focal position is selected based on atmospheric pressure, so that the focus shift due to the change in the atmospheric pressure is corrected (reduced). An amount of change in a focal position of the zoom lens according to the present numerical example at 0.7 atmospheric pressure with respect to the focal position at 1 atmospheric pressure serving as a reference is −12 µm at the wide-angle end, and −79 µm at the telephoto end. An amount of change in a movement locus of the fourth lens unit U4 for correcting the amount of change in the focal position is +13 µm at the wide-angle end, and +107 µm at the telephoto end.

A table 1 indicates values related to the inequalities (1), (5), and (6) according to the first numerical example to the fifth numerical example. Each numerical example satisfies the inequalities (1), (5), and (6). Accordingly, the lens apparatuses according to the respective numerical examples are beneficial in correcting the change in the focal position due to the change in the atmospheric pressure.

Detailed numerical values according to the respective numerical examples will be described below. In each numerical example, a curvature radius of each surface is r, an interval between surfaces is d, and an Abbe constant is vd. An absolute refractive index of the d-line of the Fraunhofer lines is nd or Nd. The refractive indexes with respect to the g-line, F-line, d-line, and C-line of the Fraunhofer lines are Ng, NF, Nd, and NC, respectively, and definitions of the Abbe constant vd and a partial dispersion ratio θgf are the same as those typically used. Thus, the relationship thereof is expressed as the following expressions.

$$vd = (Nd-1)/(NF-NC)$$

$$\theta gf = (Ng-NF)/(NF-NC)$$

The shape of an Aspherical surface is defined by the following expression:

$$X = \frac{H^2/R}{1+\sqrt{1-(1+k)(H/R)^2}} + A4H^4 + A6H^6 + A8H^8 + A10H^{10} + A12H^{12} + A14H^{14} + A16H^{16} + A3H^3 + A5H^5 + A7H^7 + A9H^9 + A11H^{11} + A13H^{13} + A15H^{15}$$

where the optical axis direction is an X-axis direction, a direction orthogonal to the optical axis direction is an H-axis direction, a traveling direction of light is the positive direction, a paraxial curvature radius is R, a conic constant is k, and Aspherical surface coefficients are A3, A4, A5, A6, A7, A8, A9, A10, A11, A12, A13, A14, A15, and A16. In this expression, "e-Z" means "×10$^{-z}$". The surface number denoted by an asterisk "*" indicates that the surface is the Aspherical surface.

First Numerical Example

Unit: mm

Surface data

| Surface Number | r | d | nd | vd | Effective diameter |
|---|---|---|---|---|---|
| 1 | 211.684 | 3.00 | 1.83449 | 37.2 | 116.86 |
| 2 | 119.284 | 1.07 | 1.00027 | 0.0 | 112.54 |
| 3 | 117.822 | 15.47 | 1.43425 | 95.1 | 112.50 |
| 4 | 956.897 | 11.15 | 1.00027 |  | 111.55 |
| 5 | 162.287 | 8.77 | 1.43425 | 95.1 | 105.34 |
| 6 | 620.009 | 0.20 | 1.00027 |  | 104.87 |
| 7 | 157.165 | 8.12 | 1.43425 | 95.1 | 103.31 |
| 8 | 505.421 | 0.20 | 1.00027 |  | 102.58 |
| 9 | 141.065 | 8.69 | 1.43425 | 95.1 | 99.63 |
| 10 | 510.399 | (Variable) |  |  | 98.57 |
| 11 | 49.865 | 1.00 | 2.00384 | 28.3 | 35.12 |
| 12 | 24.717 | 9.77 | 1.00027 |  | 31.00 |
| 13 | −38.300 | 0.90 | 1.81649 | 46.6 | 29.76 |
| 14 | 195.231 | 0.70 | 1.00027 |  | 29.53 |
| 15 | 49.164 | 4.90 | 1.92337 | 18.9 | 29.61 |
| 16 | −98.473 | 2.23 | 1.00027 |  | 29.17 |
| 17 | −56.568 | 1.10 | 1.81649 | 46.6 | 27.70 |
| 18 | 74.855 | (Variable) |  |  | 26.84 |
| 19 | −48.752 | 1.30 | 1.71746 | 47.9 | 25.71 |
| 20 | 57.835 | 1.30 | 1.84698 | 23.9 | 27.24 |
| 21 | 341.243 | (Variable) |  |  | 27.65 |
| 22(Stop) | ∞ | 3.24 | 1.00027 |  | 33.60 |
| 23 | 279.345 | 6.76 | 1.60781 | 56.8 | 35.84 |
| 24 | −52.197 | 0.15 | 1.00027 |  | 36.70 |
| 25 | −693.828 | 3.29 | 1.51863 | 58.9 | 36.83 |
| 26 | −112.257 | 0.35 | 1.00027 |  | 36.92 |
| 27 | 42.232 | 9.43 | 1.48789 | 70.2 | 36.28 |
| 28 | −123.578 | 1.50 | 1.83449 | 37.2 | 34.75 |
| 29 | −2415.030 | 0.15 | 1.00027 |  | 34.09 |
| 30 | 33.247 | 8.31 | 1.48789 | 70.2 | 32.06 |
| 31 | −84.957 | 1.50 | 1.88350 | 40.8 | 30.17 |
| 32 | 30.301 | (Variable) |  |  | 27.54 |
| 33 | −120.629 | 4.64 | 1.51782 | 52.4 | 30.99 |
| 34 | −35.365 | 2.54 | 1.00027 |  | 31.27 |
| 35 | 63.076 | 1.20 | 1.78637 | 44.2 | 28.81 |
| 36 | 31.790 | 6.50 | 1.51782 | 52.4 | 27.80 |
| 37 | −109.650 | 2.01 | 1.00027 |  | 27.42 |
| 38 | 76.161 | 5.44 | 1.51782 | 52.4 | 25.92 |
| 39 | −36.256 | 1.20 | 1.83530 | 42.7 | 25.15 |
| 40 | 48.072 | 0.67 | 1.00027 |  | 24.34 |
| 41 | 33.725 | 4.04 | 1.48789 | 70.2 | 24.53 |
| 42 | −225.928 | (Variable) |  |  | 24.30 |
| 43 | ∞ | 33.00 | 1.60902 | 46.4 | 40.00 |
| 44 | ∞ | 13.20 | 1.51721 | 64.2 | 40.00 |
| 45 | ∞ | (Variable) |  |  | 40.00 |
| image plane | ∞ |  |  |  |  |

Various types of data

| Zoom ratio | 39.81 | |
| Focal length | 11.03 | 439.19 |
| F-number | 2.10 | 4.10 |
| Angle of view | 26.50 | 0.72 |
| Image height | 5.50 | 5.50 |
| Total lens length | 389.28 | 389.28 |
| BF | 11.36 | 11.36 |
| d10 | 7.32 | 116.28 |
| d18 | 115.82 | 15.43 |
| d21 | 10.40 | 1.83 |
| d32 | 50.00 | 50.00 |
| d42 | 3.80 | 3.80 |
| d45 | 11.36 | 11.36 |
| Position of entrance pupil | 96.73 | 2379.11 |
| Position of exit pupil | 293.25 | 293.25 |
| Front principal point position | 108.20 | 3502.55 |
| Rear principal point position | 0.33 | −427.83 |

Unit: mm

Zoom lens unit data

| Unit | Starting surface | Focal length | Lens structure length | Front principal point position | Rear principal point position |
|---|---|---|---|---|---|
| 1 | 1 | 161.95 | 56.68 | 27.08 | −16.36 |
| 2 | 11 | −20.39 | 20.61 | 7.33 | −7.47 |
| 3 | 19 | −66.65 | 4.17 | 0.27 | −2.03 |
| 4 | 22 | 49.82 | 34.68 | −10.30 | −24.33 |
| 5 | 33 | 57.92 | 28.24 | 3.95 | −16.00 |
| 6 | 43 | ∞ | 46.20 | 14.60 | −14.60 |

Second Numerical Example

Unit: mm

Surface data

| Surface Number | r | d | nd | vd | Effective diameter |
|---|---|---|---|---|---|
| 1 | 164.542 | 17.02 | 1.48789 | 70.2 | 128.57 |
| 2 | −2190.491 | 1.00 | 1.00027 | | 127.75 |
| 3 | 163.406 | 3.40 | 1.72962 | 54.7 | 121.68 |
| 4 | 105.236 | 5.74 | 1.00027 | | 116.27 |
| 5 | 118.299 | 22.48 | 1.43425 | 95.1 | 115.91 |
| 6 | −391.744 | 1.50 | 1.00027 | | 114.67 |
| 7 | −311.036 | 3.20 | 1.72962 | 54.7 | 114.36 |
| 8 | 192.990 | 17.07 | 1.00027 | | 110.42 |
| 9 | 154.702 | 17.13 | 1.43425 | 95.1 | 110.82 |
| 10 | −398.948 | 0.20 | 1.00027 | | 110.17 |
| 11 | 138.851 | 7.13 | 1.43425 | 95.1 | 103.92 |
| 12 | 229.587 | (Variable) | | | 102.37 |
| 13* | 10889.244 | 1.20 | 1.77297 | 49.6 | 31.61 |
| 14 | 29.856 | 5.87 | 1.00027 | | 28.82 |
| 15 | −158.065 | 1.00 | 1.61843 | 63.3 | 28.49 |
| 16 | 31.991 | 7.28 | 1.72093 | 34.7 | 28.18 |
| 17 | −76.450 | 3.06 | 1.00027 | | 28.16 |
| 18 | −36.038 | 1.00 | 1.61843 | 63.3 | 28.04 |
| 19 | 460.546 | 0.20 | 1.00027 | | 29.13 |
| 20 | 77.615 | 2.85 | 1.54855 | 45.8 | 29.81 |
| 21 | 913.445 | (Variable) | | | 30.06 |
| 22 | −74.286 | 1.00 | 1.72962 | 54.7 | 38.26 |
| 23 | 168.941 | 3.38 | 1.84715 | 23.8 | 39.86 |
| 24 | −1285.456 | (Variable) | | | 40.47 |
| 25 | 78.883 | 8.43 | 1.59392 | 67.0 | 45.06 |
| 26* | −77.092 | 1.00 | 1.00027 | | 45.25 |
| 27 | 50.042 | 8.78 | 1.59565 | 67.7 | 43.82 |
| 28 | −139.554 | 3.00 | 1.00027 | | 42.89 |
| 29(Stop) | ∞ | 3.00 | 1.00027 | | 38.13 |
| 30 | −139.468 | 4.62 | 1.43913 | 94.9 | 36.28 |
| 31 | −45.110 | 1.20 | 2.00384 | 28.3 | 35.00 |
| 32 | 94.960 | 3.46 | 1.00027 | | 34.20 |
| 33 | 43.242 | 9.04 | 1.56774 | 42.8 | 34.83 |
| 34 | −64.973 | 4.22 | 1.00027 | | 34.07 |
| 35 | −367.839 | 1.20 | 2.00153 | 29.1 | 29.29 |
| 36 | 19.475 | 8.02 | 1.84715 | 23.8 | 27.05 |
| 37 | 204.743 | (Variable) | | | 26.46 |
| 38 | 47.069 | 3.59 | 1.48789 | 70.2 | 21.60 |
| 39 | −174.898 | 7.39 | 1.00027 | | 21.38 |
| 40 | −29.977 | 1.00 | 1.88350 | 40.8 | 20.01 |
| 41 | 25.641 | 7.29 | 1.71782 | 29.5 | 21.06 |
| 42 | −22.137 | 2.00 | 1.00027 | | 21.77 |
| 43 | −17.575 | 1.00 | 1.95427 | 32.3 | 21.48 |
| 44 | −60.000 | 8.54 | 1.51782 | 52.4 | 23.58 |
| 45 | −18.621 | (Variable) | | | 26.37 |
| Image plane | ∞ | | | | |

Unit: mm

Aspherical surface data

The thirteenth surface

K = 9.77458e+004 A 4= 2.20189e−006
A 6 = 2.88707e−011 A 8 = 2.09078e−012
A10 = −1.14265e−013 A12 = 9.17677e−016
A14 = −3.08089e−018 A16 = 3.85985e−021

The twenty-sixth surface

K = −9.05930e−001 A 4 = 7.04555e−007
A 6 = 2.55835e−010 A 8 = −9.15718e−013
A10 = 2.78952e−015 A12 = −2.67183e−018
A14 = −1.00580e−021 A16 = 2.50307e−024

Various types of data

| | | |
|---|---|---|
| Zoom ratio | 18.00 | |
| Focal length | 50.01 | 900.17 |
| F-number | 4.51 | 7.00 |
| Angle of view | 17.59 | 1.01 |
| Image height | 15.85 | 15.85 |
| Total lens length | 450.92 | 450.92 |
| BF | 45.92 | 45.92 |
| d12 | 10.00 | 137.51 |
| d21 | 137.35 | 13.37 |
| d24 | 4.99 | 1.47 |
| d37 | 43.19 | 43.19 |
| d45 | 45.92 | 45.92 |
| Position of entrance pupil | 173.81 | 2263.76 |
| Position of exit pupil | −117.95 | −117.95 |
| Front principal point position | 208.56 | −1780.85 |
| Rear principal point position | −4.09 | −854.24 |

Zoom lens unit data

| Unit | Starting surface | Focal length | Lens structure length | Front principal point position | Rear principal point position |
|---|---|---|---|---|---|
| 1 | 1 | 224.99 | 95.88 | 36.30 | −45.01 |
| 2 | 13 | −33.00 | 22.45 | 2.64 | −13.59 |
| 3 | 22 | −118.41 | 4.38 | −0.24 | −2.65 |
| 4 | 25 | 46.35 | 55.97 | −12.54 | −40.29 |
| 5 | 38 | 3886.44 | 30.80 | 483.20 | 519.79 |

Third Numerical Example

Unit: mm

Surface data

| Surface number | r | d | nd | vd | Effective diameter |
|---|---|---|---|---|---|
| 1* | 83.409 | 2.50 | 1.77297 | 49.6 | 76.26 |
| 2 | 29.520 | 16.93 | 1.00027 | | 55.87 |
| 3 | 63.802 | 2.00 | 1.77297 | 49.6 | 53.21 |
| 4 | 31.287 | 18.01 | 1.00027 | | 46.86 |
| 5 | −56.871 | 2.00 | 1.58955 | 61.1 | 46.50 |
| 6 | −559.990 | 1.50 | 1.00027 | | 49.05 |
| 7 | 70.893 | 5.61 | 1.92337 | 18.9 | 54.81 |
| 8 | 200.025 | 3.93 | 1.00027 | | 54.69 |
| 9 | 804.203 | 7.70 | 1.48789 | 70.2 | 55.05 |
| 10 | −75.009 | 5.45 | 1.00027 | | 55.19 |
| 11 | 463.190 | 2.00 | 1.84715 | 23.8 | 52.19 |
| 12 | 41.368 | 12.00 | 1.48789 | 70.2 | 50.52 |
| 13 | −175.227 | 0.15 | 1.00027 | | 50.77 |
| 14 | 95.756 | 11.57 | 1.49740 | 81.5 | 51.32 |
| 15 | −56.664 | 0.15 | 1.00027 | | 51.08 |
| 16 | 47.943 | 4.19 | 1.77297 | 49.6 | 42.52 |
| 17 | 110.525 | (Variable) | | | 41.60 |

-continued

Unit: mm

| | | | | | |
|---|---|---|---|---|---|
| 18 | 447.083 | 1.20 | 1.75547 | 52.3 | 25.90 |
| 19 | 22.758 | 4.32 | 1.00027 | | 22.72 |
| 20 | −117.751 | 1.20 | 1.49740 | 81.5 | 22.32 |
| 21 | 22.853 | 4.01 | 1.78517 | 26.3 | 23.15 |
| 22 | 101.016 | 4.25 | 1.00027 | | 23.10 |
| 23 | −25.396 | 1.20 | 1.83449 | 37.2 | 23.19 |
| 24 | −34.691 | (Variable) | | | 24.13 |
| 25 | 216.389 | 2.74 | 1.65044 | 65.5 | 25.37 |
| 26 | −97.018 | 0.20 | 1.00027 | | 25.60 |
| 27 | 62.541 | 5.17 | 1.49740 | 81.5 | 25.79 |
| 28 | −37.393 | 1.40 | 1.83449 | 37.2 | 25.66 |
| 29 | −90.520 | (Variable) | | | 25.83 |
| 30(Stop) | ∞ | 1.42 | 1.00027 | | 24.29 |
| 31 | 44.514 | 5.87 | 1.76229 | 26.5 | 23.91 |
| 32 | −57.831 | 1.50 | 1.72093 | 34.7 | 22.95 |
| 33 | 37.064 | (Variable) | | | 21.56 |
| 34 | 129.264 | 1.50 | 1.83449 | 37.2 | 20.31 |
| 35 | 44.467 | 5.52 | 1.49740 | 81.5 | 19.99 |
| 36 | −47.210 | 5.45 | 1.00027 | | 19.79 |
| 37 | 38.045 | 5.67 | 1.49740 | 81.5 | 21.72 |
| 38 | −29.137 | 1.50 | 1.83449 | 37.2 | 21.64 |
| 39 | 34.796 | 5.00 | 1.00027 | | 22.25 |
| 40 | 42.347 | 6.97 | 1.48789 | 70.2 | 27.15 |
| 41 | −38.007 | (Variable) | | | 27.79 |
| Image plane | ∞ | | | | |

Aspherical surface data

The first surface

K = 0.00000e+000 A 4 = 1.86640e−006
A 6 = −6.57382e−010 A 8 = 8.07136e−013
A10 = −4.17237e−016 A12 = 1.14703e−019

Various types of data

| | | |
|---|---|---|
| Zoom ratio | | 2.86 |
| Focal length | 13.99 | 39.97 |
| F-number | 2.80 | 2.80 |
| Angle of view | 48.02 | 21.26 |
| Image height | 15.55 | 15.55 |
| Total lens length | 251.89 | 251.89 |
| BF | 40.01 | 40.01 |
| d17 | 2.09 | 26.84 |
| d24 | 28.66 | 1.20 |
| d29 | 8.67 | 11.38 |
| d33 | 10.68 | 10.68 |
| d41 | 40.01 | 40.01 |
| Position of entrance pupil | 34.77 | 47.59 |
| Position of exit pupil | −72.22 | −72.22 |
| Front principal point position | 47.02 | 73.33 |
| Rear principal point position | 26.02 | 0.03 |

Zoom lens unit data

| Unit | Starting surface | Focal length | Lens structure length | Front principal point position | Rear principal point position |
|---|---|---|---|---|---|
| 1 | 1 | 25.08 | 95.70 | 46.06 | 42.36 |
| 2 | 18 | −24.01 | 16.17 | 2.88 | −9.44 |
| 3 | 25 | 56.53 | 9.51 | 1.93 | −4.22 |
| 4 | 30 | −4175.33 | 8.79 | 332.76 | 303.09 |
| 5 | 34 | 76.45 | 31.62 | 19.02 | −8.35 |

Fourth Numerical Example

Unit: mm

Surface data

| Surface number | r | d | nd | vd | Effective diameter |
|---|---|---|---|---|---|
| 1* | 260.189 | 2.60 | 1.80448 | 46.5 | 74.49 |
| 2 | 28.143 | 20.19 | 1.00027 | 0.0 | 51.64 |
| 3 | −183.262 | 1.90 | 1.80148 | 35.0 | 50.38 |
| 4 | 31.016 | 11.59 | 1.84715 | 23.8 | 46.41 |
| 5 | 194.218 | 5.78 | 1.00027 | 0.0 | 45.60 |
| 6 | 315.462 | 5.70 | 1.69725 | 55.5 | 43.53 |
| 7* | −87.666 | 3.99 | 1.00027 | 0.0 | 43.37 |
| 8 | −192.000 | 10.07 | 1.43913 | 94.7 | 42.72 |
| 9 | −32.594 | 1.80 | 1.89241 | 37.1 | 43.11 |
| 10 | −103.402 | 0.20 | 1.00027 | 0.0 | 46.74 |
| 11 | 431.677 | 1.80 | 1.80148 | 35.0 | 48.63 |
| 12 | 99.474 | 12.78 | 1.43913 | 94.7 | 49.63 |
| 13 | −48.808 | 0.45 | 1.00027 | 0.0 | 50.74 |
| 14 | −246.591 | 6.82 | 1.43425 | 95.1 | 51.50 |
| 15 | −57.432 | 0.45 | 1.00027 | 0.0 | 51.80 |
| 16 | 231.870 | 5.57 | 1.76432 | 48.5 | 49.97 |
| 17 | −114.798 | (Variable) | | | 49.64 |
| 18 | 522.067 | 0.80 | 1.95427 | 32.3 | 21.30 |
| 19 | 19.610 | 4.57 | 1.00027 | 0.0 | 19.34 |
| 20 | −31.234 | 0.80 | 1.59565 | 67.7 | 19.27 |
| 21 | −105.818 | 1.22 | 1.00027 | 0.0 | 19.55 |
| 22 | −72.003 | 4.41 | 1.85528 | 24.8 | 19.68 |
| 23 | −18.964 | 0.80 | 1.88350 | 40.8 | 20.12 |
| 24 | −2285.459 | 0.20 | 1.00027 | 0.0 | 20.90 |
| 25 | 57.547 | 3.79 | 1.65456 | 39.7 | 21.40 |
| 26 | −39.501 | (Variable) | | | 21.50 |
| 27 | −35.891 | 0.80 | 1.72962 | 54.7 | 20.44 |
| 28 | 40.158 | 2.60 | 1.85528 | 24.8 | 21.69 |
| 29 | 322.662 | (Variable) | | | 22.04 |
| 30(Stop) | ∞ | 1.40 | 1.00027 | 0.0 | 26.39 |
| 31 | −578.359 | 3.14 | 1.80148 | 35.0 | 27.10 |
| 32 | −48.365 | 0.15 | 1.00027 | 0.0 | 27.53 |
| 33 | 227.933 | 1.96 | 1.69725 | 55.5 | 27.86 |
| 34 | −291.203 | 0.15 | 1.00027 | 0.0 | 27.89 |
| 35 | 71.130 | 5.88 | 1.53213 | 48.8 | 27.84 |
| 36 | −36.462 | 1.00 | 1.95427 | 32.3 | 27.56 |
| 37 | −232.268 | (Variable) | | | 27.75 |
| 38 | 323.228 | 3.49 | 1.67315 | 32.1 | 27.64 |
| 39 | −57.787 | 0.50 | 1.00027 | 0.0 | 27.73 |
| 40 | 48.624 | 0.90 | 2.00153 | 29.1 | 26.90 |
| 41 | 22.797 | 8.34 | 1.52290 | 59.8 | 25.74 |
| 42 | −44.828 | 2.30 | 1.00027 | 0.0 | 25.49 |
| 43 | −30.253 | 0.90 | 1.88350 | 40.8 | 24.75 |
| 44 | 35.657 | 6.58 | 1.43913 | 94.7 | 25.80 |
| 45 | −42.595 | 0.20 | 1.00027 | 0.0 | 26.81 |
| 46 | 53.969 | 8.10 | 1.48789 | 70.2 | 28.69 |
| 47 | −30.439 | (Variable) | | | 28.94 |
| 48 | ∞ | 33.00 | 1.60902 | 46.4 | 40.00 |
| 49 | ∞ | 13.20 | 1.51721 | 64.2 | 40.00 |
| 50 | ∞ | (Variable) | | | 40.00 |
| Image plane | ∞ | | | | |

Aspherical surface data

The first surface

K = 9.44670e+000 A 4 = 3.81992e−006
A 6 = 4.37697e−008 A 8 = 1.41324e−010
A10 = 4.12115e−014 A12 = 5.27213e−017
A14 = −1.48898e−020 A16 = −2.56438e−024
A 3 = −3.31631e−006 A 5 = −2.56083e−007
A 7 = −3.48401e−009 A 9 = −2.98160e−012
A11 = −1.46900e−015 A13 = −5.00671e−019
A15 = 3.86866e−022

The seventh surface

K = −6.04584e−001 A 4 = 6.86726e−007
A 6 = −8.39702e−008 A 8 = −5.93636e−010
A10 = 1.24241e−012 A12 = −1.00949e−014

-continued

Unit: mm

A14 = −1.46071e−017 A16 = 1.48555e−022
A 3 = 3.03499e−007 A 5 = 3.72098e−007
A 7 = 1.02287e−008 A 9 = 2.16581e−008
A11 = 2.59634e−014 A13 = 5.86785e−016
A15 = 1.33930e−019

Various types of data

| | | |
|---|---|---|
| Zoom ratio | | 9.00 |
| Focal length | 4.60 | 41.40 |
| F-number | 1.86 | 2.41 |
| Angle of view | 50.09 | 7.57 |
| Image height | 5.50 | 5.50 |
| Total lens length | 313.68 | 313.68 |
| BF | 7.45 | 7.45 |
| d17 | 0.85 | 61.66 |
| d26 | 54.43 | 1.50 |
| d29 | 9.78 | 1.90 |
| d37 | 34.30 | 34.30 |
| d47 | 4.00 | 4.00 |
| d50 | 7.45 | 7.45 |
| Position of entrance pupil | 28.64 | 70.42 |
| Position of exit pupil | 225.33 | 225.33 |
| Front principal point position | 33.34 | 119.69 |
| Rear principal point position | 2.85 | −33.95 |

Zoom lens unit data

| Unit | Starting surface | Focal length | Lens structure length | Front principal point position | Rear principal point position |
|---|---|---|---|---|---|
| 1 | 1 | 32.79 | 91.68 | 46.44 | 56.94 |
| 2 | 18 | −29.19 | 16.60 | −4.52 | −20.61 |
| 3 | 27 | −50.25 | 3.40 | 0.18 | −1.68 |
| 4 | 30 | 46.75 | 13.68 | 2.21 | −6.56 |
| 5 | 38 | 49.93 | 31.30 | 18.34 | −6.93 |
| 6 | 48 | ∞ | 46.20 | 14.60 | −14.60 |

Fifth Numerical Example

Unit: mm

Surface data

| Surface Number | r | d | nd | νd | Effective diameter |
|---|---|---|---|---|---|
| 1 | 142.326 | 3.48 | 1.84715 | 23.8 | 58.71 |
| 2 | 63.356 | 11.03 | 1.69725 | 55.5 | 57.14 |
| 3 | −1869.373 | 0.73 | 1.00027 | | 56.54 |
| 4 | 58.101 | 6.11 | 1.77297 | 49.6 | 54.40 |
| 5 | 133.007 | (Variable) | | | 53.18 |
| 6 | 62.038 | 2.02 | 1.88350 | 40.8 | 26.42 |
| 7 | 18.143 | 6.66 | 1.00027 | | 21.41 |
| 8 | −52.406 | 1.83 | 1.77297 | 49.6 | 19.04 |
| 9 | 17.773 | 3.63 | 1.00027 | | 17.33 |
| 10 | 24.602 | 3.86 | 1.92337 | 18.9 | 18.08 |
| 11 | 57.897 | (Variable) | | | 17.37 |
| 12(Stop) | ∞ | 4.03 | 1.00027 | | 22.97 |
| 13* | 31.553 | 10.25 | 1.58355 | 59.4 | 24.61 |
| 14 | −60.766 | 1.52 | 1.00027 | | 23.94 |
| 15 | 42.526 | 2.20 | 1.84715 | 23.8 | 22.24 |
| 16 | 25.200 | (Variable) | | | 20.85 |
| 17 | 49.578 | 10.67 | 1.65888 | 50.9 | 18.35 |
| 18 | −19.768 | 1.83 | 1.84715 | 23.8 | 16.61 |
| 19 | −40.816 | (Variable) | | | 16.33 |
| 20 | ∞ | 8.70 | 1.51674 | 64.1 | 40.00 |
| 21 | ∞ | (Variable) | | | 40.00 |
| Image plane | ∞ | | | | |

Aspherical surface data

The thirteenth surface

K = −2.33784e+000 A 4 = 1.44539e−007
A 6 = −2.77612e−009 A 8 = 7.66332e−013

Various types of data

| | | |
|---|---|---|
| Zoom ratio | | 24.34 |
| Focal length | 9.76 | 237.53 |
| F-number | 1.85 | 4.10 |
| Angle of view | 29.40 | 1.33 |
| Image height | 5.50 | 5.50 |
| Total lens length | 187.37 | 187.37 |
| BF | 7.03 | 7.03 |
| d5 | 2.12 | 59.27 |
| d11 | 60.96 | 3.81 |
| d16 | 23.00 | 33.51 |
| d19 | 15.69 | 5.18 |
| d21 | 7.03 | 7.03 |
| Position of entrance pupil | 41.26 | 814.27 |
| Position of exit pupil | −470.34 | 295.97 |
| Front principal point position | 50.82 | 1247.07 |
| Rear principal point position | −2.73 | −230.50 |

Zoom lens unit data

| Unit | Starting surface | Focal length | Lens structure length | Front principal point position | Rear principal point position |
|---|---|---|---|---|---|
| 1 | 1 | 86.84 | 21.36 | 4.31 | −8.29 |
| 2 | 6 | −13.83 | 18.00 | 3.93 | −10.21 |
| 3 | 12 | 58.18 | 18.00 | −0.46 | −12.37 |
| 4 | 17 | 42.63 | 12.50 | 4.01 | −3.84 |
| 5 | 20 | ∞ | 8.70 | 2.87 | −2.87 |

TABLE 1

| | | 1st Numerical example | 2nd Numerical example | 3rd Numerical example | 4th Numerical example | 5th Numerical example |
|---|---|---|---|---|---|---|
| Conditional Expression (1) | \|fv/fw\| | 1.85 | 0.66 | 1.72 | 6.35 | 1.42 |
| Conditional Expression (5) | \|fair_t/fw\| | 1.50 | 0.63 | 0.90 | 3.28 | 1.50 |
| Conditional Expression (6) | \|βt/βw\| | 69.43 | 19.66 | 2.77 | 16.47 | 38.56 |

While the exemplary embodiments of the disclosure have been described, it goes without saying that the disclosure is not limited to the exemplary embodiments, and various modifications and changes can be made without departing from the gist of the disclosure. The disclosure can include, for example, the aspect of the embodiments that relates to a method of correcting the change in the focal position, due to the change in the atmospheric pressure, of the lens apparatus including the variable magnification lens units that move in the optical axis direction for the varying magnification. Further, the disclosure can include the aspect of the embodiments that relates to a program causing a computer to execute the method, and the aspect of the embodiments that relates to a computer-readable storage medium that stores the program. The method can be a method performed based on any one of six processing flows exemplified with reference to FIGS. 2, 3, 5, 7, 8, and 10. These aspects of the embodiments can be achieved by executing the following processing. The processing is executed on the premise that software or a program that achieves functions of the exemplary embodiments described above is installed in a system or an apparatus through a network for data communication or various storage media. The processing is executed by the system or the computer (or central processing unit (CPU), microprocessor unit (MPU) or the like) of the apparatus loading the software or the program. The aspect of the embodiments can be achieved by a storage medium (recording medium) that stores (records) the software or the program so as to be readable by the computer.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-085965, filed Apr. 26, 2019, which is hereby incorporated by reference herein in its entirety.

What is claimed is:

1. A lens apparatus comprising:
zoom lens units configured to move in an optical axis direction for zooming; and
a correction lens unit configured to move in the optical axis direction to correct change in a focal position due to change in an atmospheric pressure,
wherein the lens apparatus satisfies an inequality $$0.4 < |fv/fw| < 9$$

where fv is a focal length of one of the zoom lens units having a smallest absolute value of a focal length among the zoom lens units and fw is a focal length of the lens apparatus at a wide-angle end.

2. A lens apparatus comprising:
zoom lens units configured to move in an optical axis direction for zooming; and
a correction lens unit configured to move in the optical axis direction to correct change in a focal position due to change in an atmospheric pressure,
wherein the lens apparatus satisfies an inequality $$0.4 < |fair\_t/fw| < 6$$

where fair_t is a composite focal length of an air lens included in one of the zoom lens units having a smallest absolute value of the composite focal length of the air lens among the zoom lens units and fw is a focal length of the lens apparatus at a wide-angle end,
wherein the composite focal length fair_t is defined by an equation $$\text{fair\_t} = \frac{1}{\Sigma_i \left(\frac{1}{\text{fair\_i}}\right)} \quad (1)$$

where fair_i is a focal length of an i-th air lens as one of the air lens,
wherein the focal length fair_i of the i-th air lens is defined by an equation $$\text{fair\_i} = \frac{1}{\frac{Nair - N1}{r1} + \frac{N2 - Nair}{r2} - \frac{d}{Nair} \times \frac{(Nair - N1)}{r1} \times \frac{(N2 - Nair)}{r2}} \quad (2)$$

where N1 is a refractive index of glass adjacent to the i-th air lens on an object side, r1 is a curvature radius of a surface of the i-th air lens on the object size, N2 is a refractive index of glass adjacent to the i-th air lens on an image side, r2 is a curvature radius of a surface of the i-th air lens on the image size, and Nair is a refractive index of the i-th air lens, and d is a thickness of the i-th air lens in the optical axis direction.

3. The lens apparatus according to claim 2, further comprising a controller configured to control a position of the correction lens unit based on information about the atmospheric pressure.

4. The lens apparatus according to claim 3, further comprising a measurement device configured to measure the atmospheric pressure.

5. The lens apparatus according to claim 3, wherein the controller is configured to obtain the information about the atmospheric pressure based on information about an altitude.

6. The lens apparatus according to claim 5, further comprising a measurement device configured to measure the altitude.

7. The lens apparatus according to claim 5, wherein the controller is configured to obtain the information about the altitude through a global positioning system.

8. The lens apparatus according to claim 3, further comprising a storage configured to store a correspondence relationship between the information about the atmospheric pressure and information about a movement amount of the correction lens unit.

9. The lens apparatus according to claim 8, wherein the controller is configured to cause, in a case where an amount of change in the atmospheric pressure relative to a reference atmospheric pressure is less than a threshold, the correction lens unit not to move.

10. The lens apparatus according to claim 9, wherein the lens apparatus satisfies an inequality $$0.5\ \text{hPa} < L < 100\ \text{hPa}$$

where L is the threshold.

11. The lens apparatus according to claim 8, wherein the storage is configured to store a plurality of ones of the correspondence relationship different from each other depending on focal lengths of the lens apparatus.

12. The lens apparatus according to claim 2, wherein the lens apparatus comprises a plurality of ones of the correction lens unit.

13. The lens apparatus according to claim 2, wherein the zoom lens units include the correction lens unit.

14. The lens apparatus according to claim 13, wherein the correction lens unit includes a plurality of movement loci different from each other corresponding to a plurality of ones of the atmospheric pressure different from each other.

15. An image pickup apparatus comprising:
the lens apparatus of claim 2, and
an image pickup element configured to pick up an image formed by the lens apparatus.

16. A lens apparatus, comprising:
zoom lens units configured to move in an optical axis direction for zooming; and
a correction lens unit configured to move in the optical axis direction to correct change in a focal position due to change in an atmospheric pressure,
wherein the lens apparatus satisfies an inequality $$2 < |\beta t/\beta w|$$

where $\beta w$ is a lateral magnification, at a wide-angle end of the lens apparatus, of one of the zoom lens units having a largest absolute value of a zoom ratio among the zoom lens units and $\beta t$ is a lateral magnification, at a telephoto end of the lens apparatus, of the one of the zoom lens units, and
wherein the zoom ratio is defined by a ratio of a lateral magnification at the telephoto end to a lateral magnification at the wide-angle end.

17. A method of correcting change in a focal position of a lens apparatus due to change in an atmospheric pressure, the lens apparatus including zoom lens units configured to move in an optical axis direction for zooming, the lens apparatus satisfying an inequality $$0.4 < |fv/fw| < 9$$

where fv is a focal length of one of the zoom lens unit having a smallest absolute value of a focal length among the zoom lens units and fw is a focal length of the lens apparatus at a wide-angle end,
wherein the method comprises: changing a position of a correction lens unit movable in the optical axis direction for the correcting based on information about the atmospheric pressure.

18. A method of correcting change in a focal position of a lens apparatus due to change in an atmospheric pressure, the lens apparatus including: zoom lens units configured to move in an optical axis direction for zooming, the lens apparatus satisfying an inequality $$0.4 < |fair\_t/fw| < 6$$

where fair_t is a composite focal length of an air lens included in one of the zoom lens unit having a smallest absolute value of the composite focal length among the zoom lens units and fw is a focal length of the lens apparatus at a wide-angle end,
wherein the method comprises: changing a position of a correction lens movable in the optical axis direction for the correcting based on information about the atmospheric pressure,
wherein the composite focal length fair_t is defined by an equation $$\text{fair}\_t = \frac{1}{\Sigma_i \left(\frac{1}{\text{fair}\_i}\right)}$$

where fair_i is a focal length of an i-th air lens as one of the air lens, and
wherein the focal length fair_i of the i-th air lens is defined by an equation $$\text{fair}\_i = \frac{1}{\frac{N\text{air} - N1}{r1} + \frac{N2 - N\text{air}}{r2} - \frac{d}{N\text{air}} \times \frac{(N\text{air} - N1)}{r1} \times \frac{(N2 - N\text{air})}{r2}}$$

where N1 is a refractive index of glass adjacent to the i-th air lens on an object side, r1 is a curvature radius of the i-th air lens on the object side, N2 is a refractive index of glass adjacent to the i-th air lens on an image side, r2 is a curvature radius of the i-th air lens on the image side, Nair is a refractive index of the i-th air lens, and d is a thickness of the i-th air lens in the optical axis direction.

19. A non-transitory computer-readable storage medium storing a program for causing a computer to execute the method of claim 18.

20. A method of correcting change in a focal position of a lens apparatus due to change in an atmospheric pressure, the lens apparatus including zoom lens units configured to move in an optical axis direction for zooming, the lens apparatus satisfying an inequality $$2 < |\beta t/\beta w|$$

where $\beta w$ is a lateral magnification, at a wide-angle end of the lens apparatus, of one of the zoom lens units having a largest absolute value of a zoom ratio among the zoom lens units and $\beta t$ is a lateral magnification, at a telephoto end of the lens apparatus, of the one of the zoom lens units, wherein the method comprises: changing a position of a correction lens unit movable in the optical axis direction for the correcting based on information about the atmospheric pressure, wherein the zoom ratio is defined by a ratio of a lateral magnification at the telephoto end to a lateral magnification at the wide-angle end.

21. A lens apparatus comprising:
zoom lens units configured to move in an optical axis direction for zooming; and
a correction lens unit configured to move in the optical axis direction to correct change in a focal position due to change in an atmospheric pressure,
wherein the lens apparatus satisfies an inequality $$0.4<|fv/fw|<9$$

where fv is a focal length of one of the zoom lens units having a smallest absolute value of a focal length among the zoom lens units and fw is a focal length of the lens apparatus at a wide-angle end,
wherein the correction lens unit is configured to move in accordance with information about the atmospheric pressure and information about a focal length of the lens apparatus.

22. The lens apparatus according to claim 21, further comprising:
a storage configured to store information of a movement amount of the correction lens unit in accordance with the information about the atmospheric pressure and the information about the focal length of the lens apparatus.

23. The lens apparatus according to claim 22, further comprising:
a controller configured to control a position of the correction lens unit based on the stored information of the movement amount of the correction lens unit.

24. The lens apparatus according to claim 23, wherein the controller is configured to cause, in a case where an amount of change in the atmospheric pressure relative to a reference atmospheric pressure is less than a threshold, the correction lens unit not to move.

25. The lens apparatus according to claim 24, wherein an inequality $$0.5\ hPa<L<100\ hPa$$

is satisfied where L is the threshold.

26. The lens apparatus according to claim 21, further comprising a measurement device configured to measure the atmospheric pressure.

27. The lens apparatus according to claim 21, wherein the information about the atmospheric pressure is obtained based on information about an altitude.

28. The lens apparatus according to claim 27, further comprising a measurement device configured to measure the altitude.

29. The lens apparatus according to claim 27, wherein the information about the altitude is obtained through a global positioning system.

30. The lens apparatus according to claim 21, wherein the lens apparatus comprises a plurality of ones of the correction lens unit.

31. The lens apparatus according to claim 21, wherein the zoom lens units include the correction lens unit.

32. The lens apparatus according to claim 31, wherein the correction lens unit includes a plurality of movement loci different from each other corresponding to a plurality of ones of the atmospheric pressure different from each other.

33. An image pickup apparatus comprising:
the lens apparatus of claim 21, and
an image pickup element configured to pick up an image formed by the lens apparatus.

34. A method of correcting change in a focal position of a lens apparatus due to change in an atmospheric pressure, the lens apparatus including: zoom lens units configured to move in an optical axis direction for zooming, and a correction lens unit configured to move in the optical axis direction to correct change in the focal position due to change in the atmospheric pressure, the lens apparatus satisfying an inequality $$0/4<|fv/fw|<9$$

where fv is a focal length of one of the zoom lens units having a smallest absolute value of a focal length among the zoom lens units and fw is a focal length of the lens apparatus at a wide-angle end,
wherein the method comprises: moving the correction lens unit in accordance with information about the atmospheric pressure and information about a focal length of the lens apparatus.

35. A non-transitory computer-readable storage medium storing a program for causing a computer to execute the method of claim 34.

* * * * *